W. T. HOOFNAGLE.
MACHINE FOR JUSTIFYING LINES OF TYPE.
APPLICATION FILED FEB. 10, 1909. RENEWED NOV. 28, 1911.
1,022,418.
Patented Apr. 9, 1912.
14 SHEETS—SHEET 1.
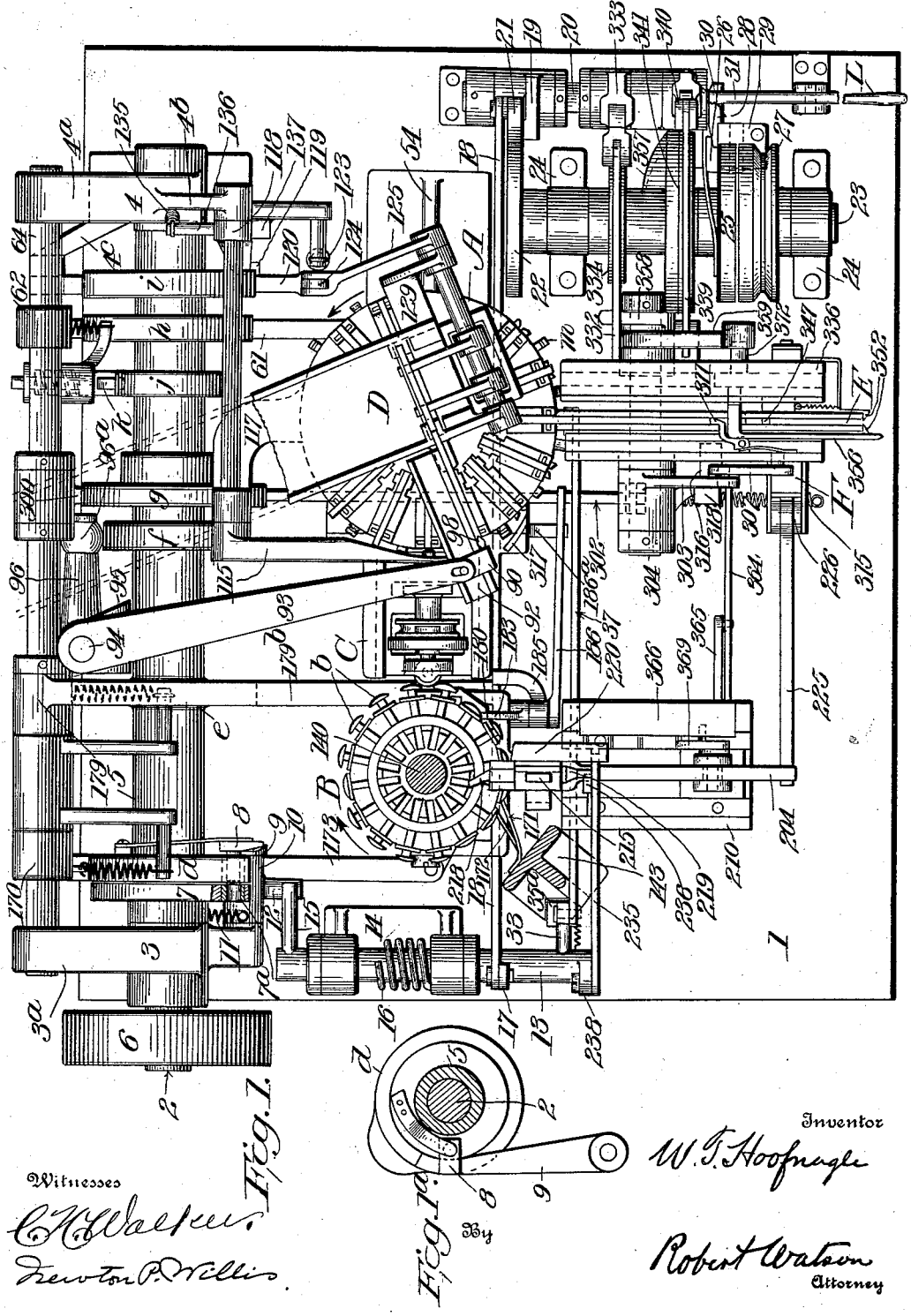
Witnesses
Inventor
W. T. Hoofnagle
By
Robert Watson
Attorney

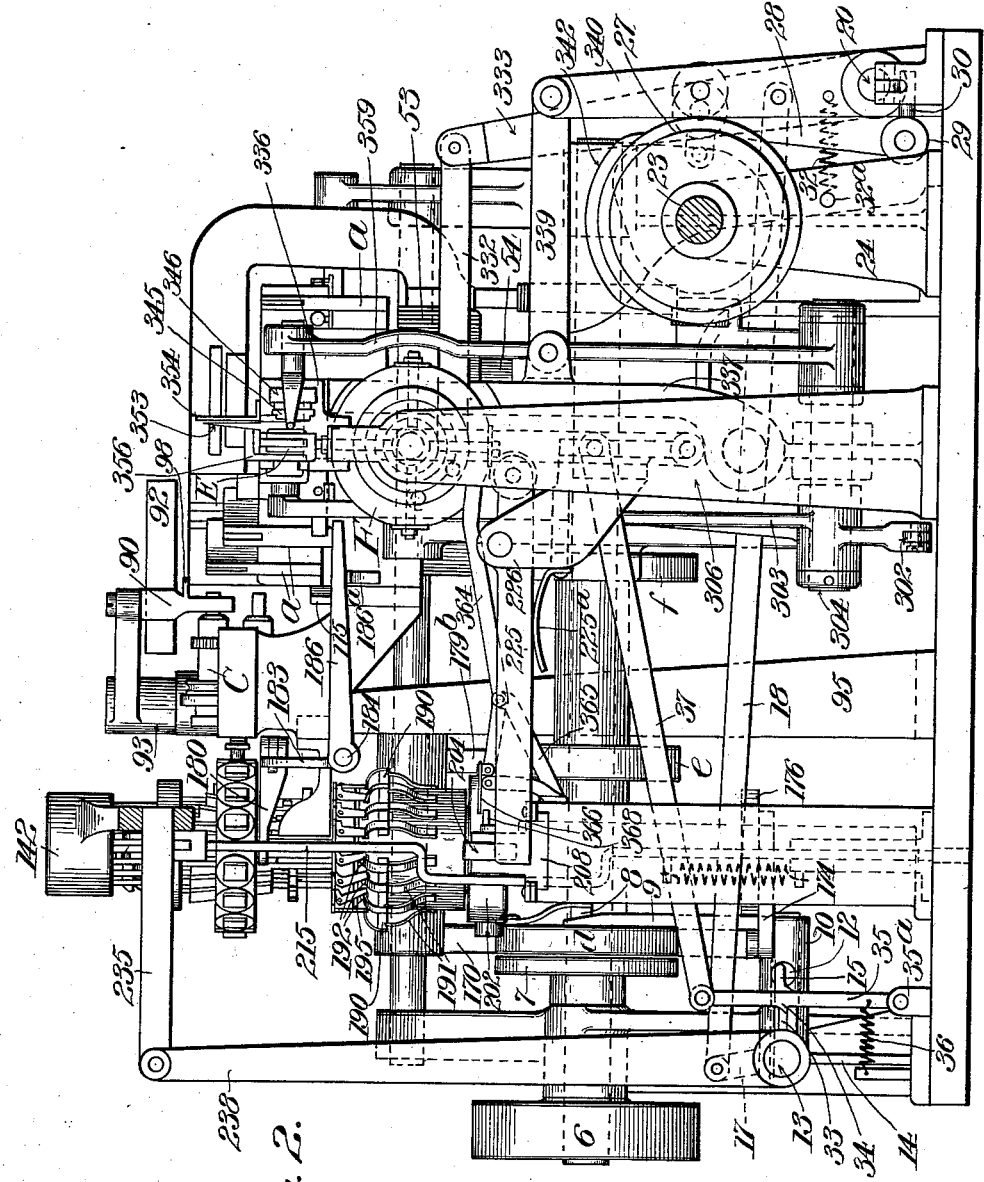

W. T. HOOFNAGLE.
MACHINE FOR JUSTIFYING LINES OF TYPE.
APPLICATION FILED FEB. 10, 1909. RENEWED NOV. 28, 1911.
1,022,418.
Patented Apr. 9, 1912.
14 SHEETS—SHEET 3.
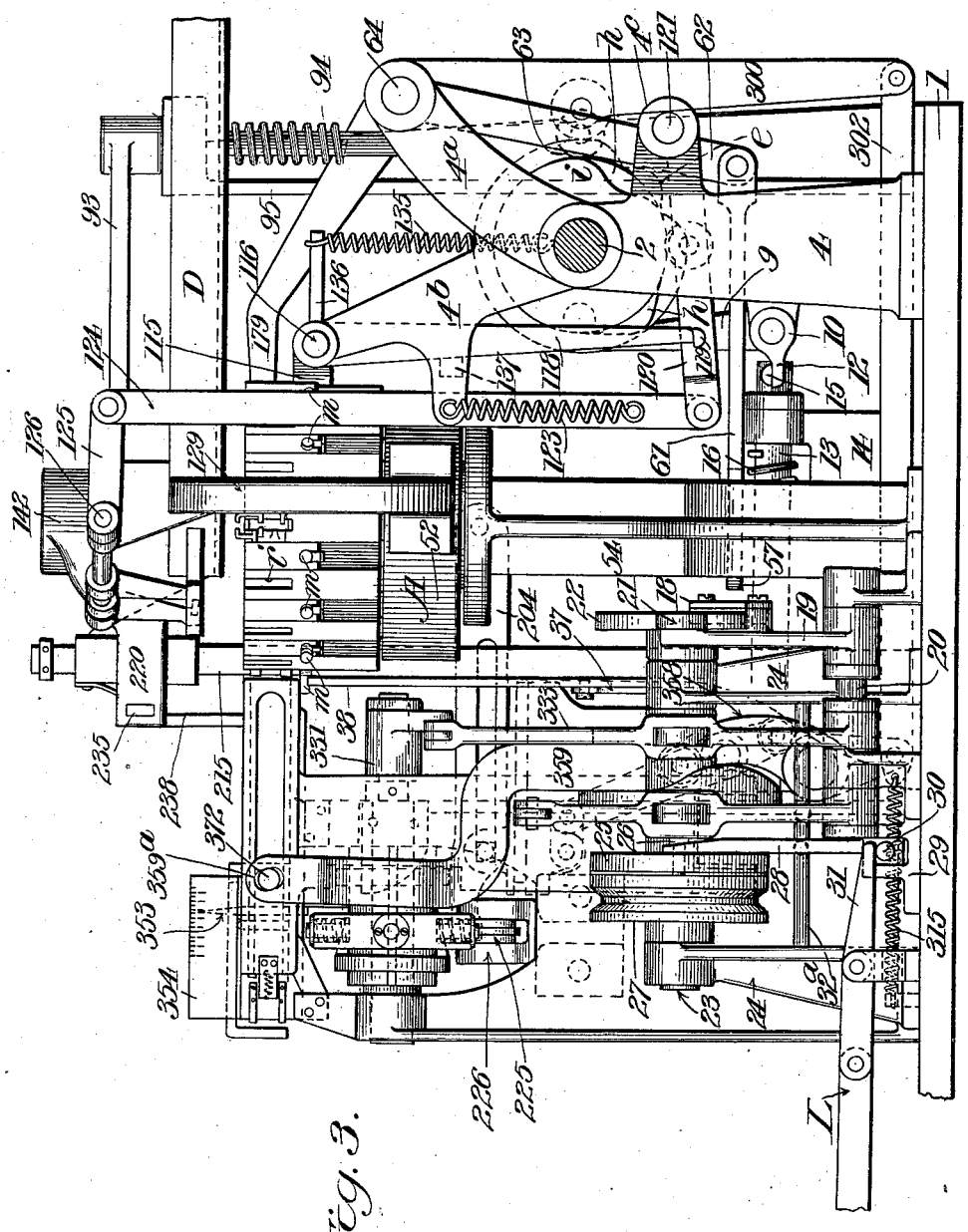

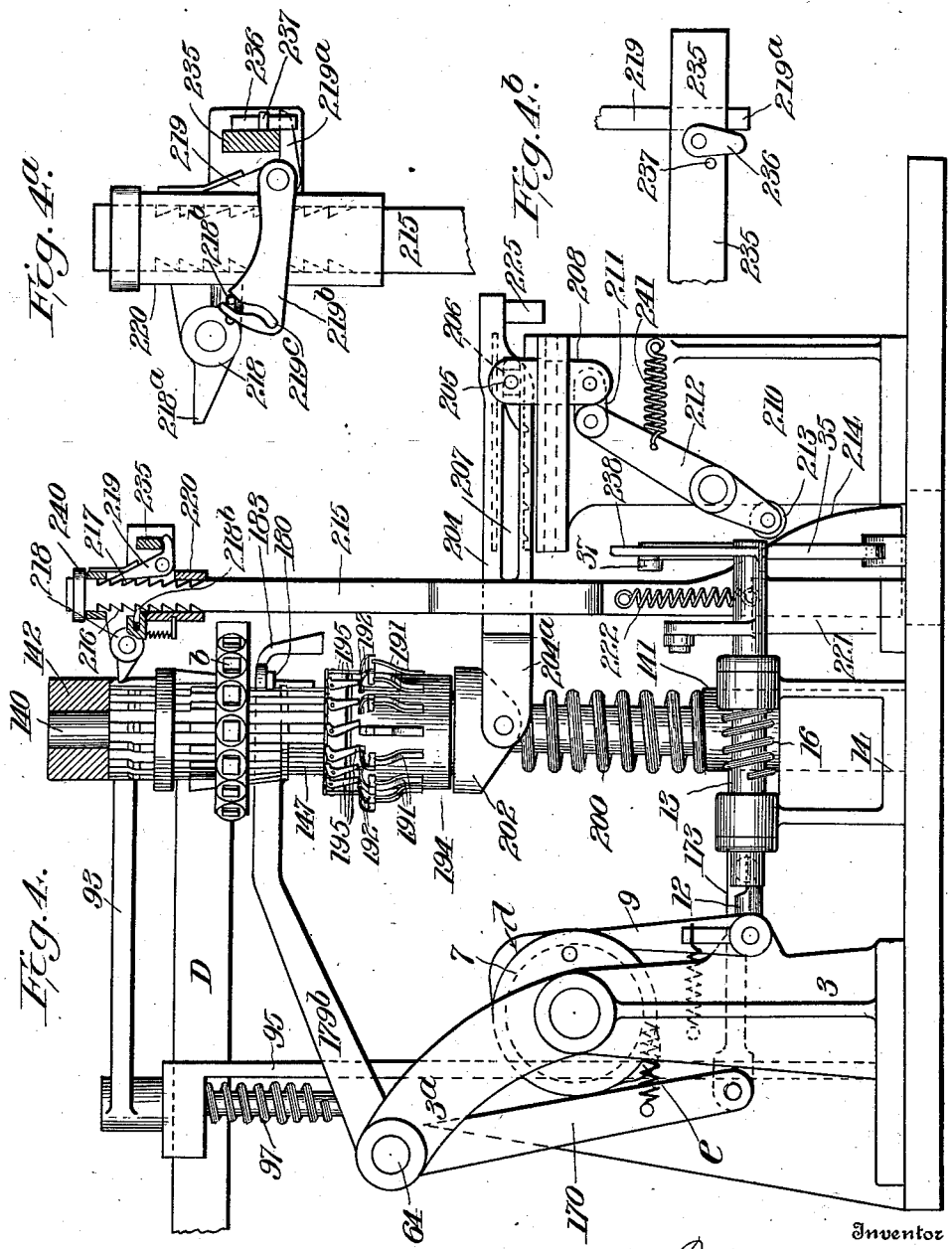

W. T. HOOFNAGLE.
MACHINE FOR JUSTIFYING LINES OF TYPE.
APPLICATION FILED FEB. 10, 1909. RENEWED NOV. 28, 1911.
1,022,418.
Patented Apr. 9, 1912.
14 SHEETS—SHEET 5.
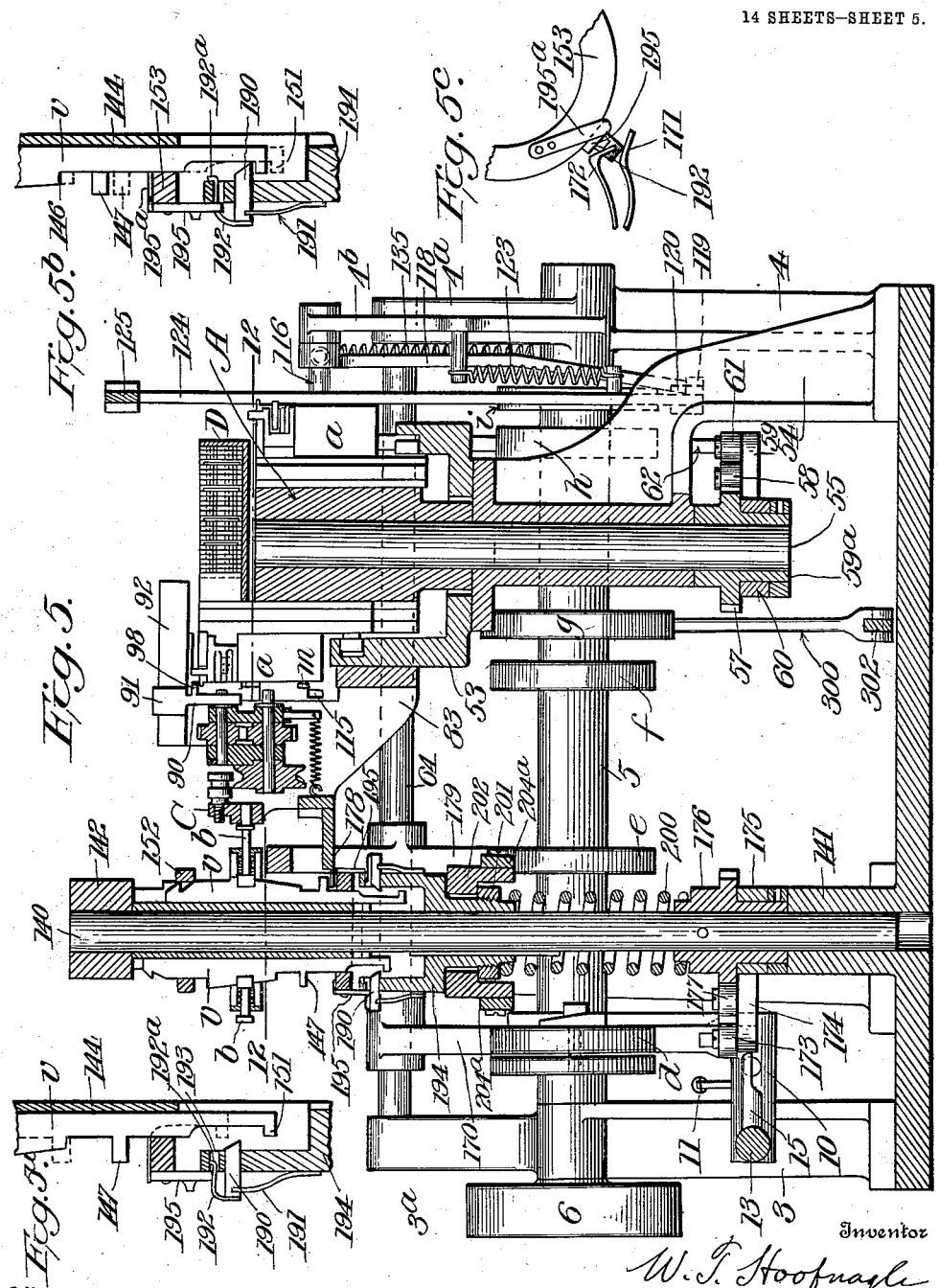

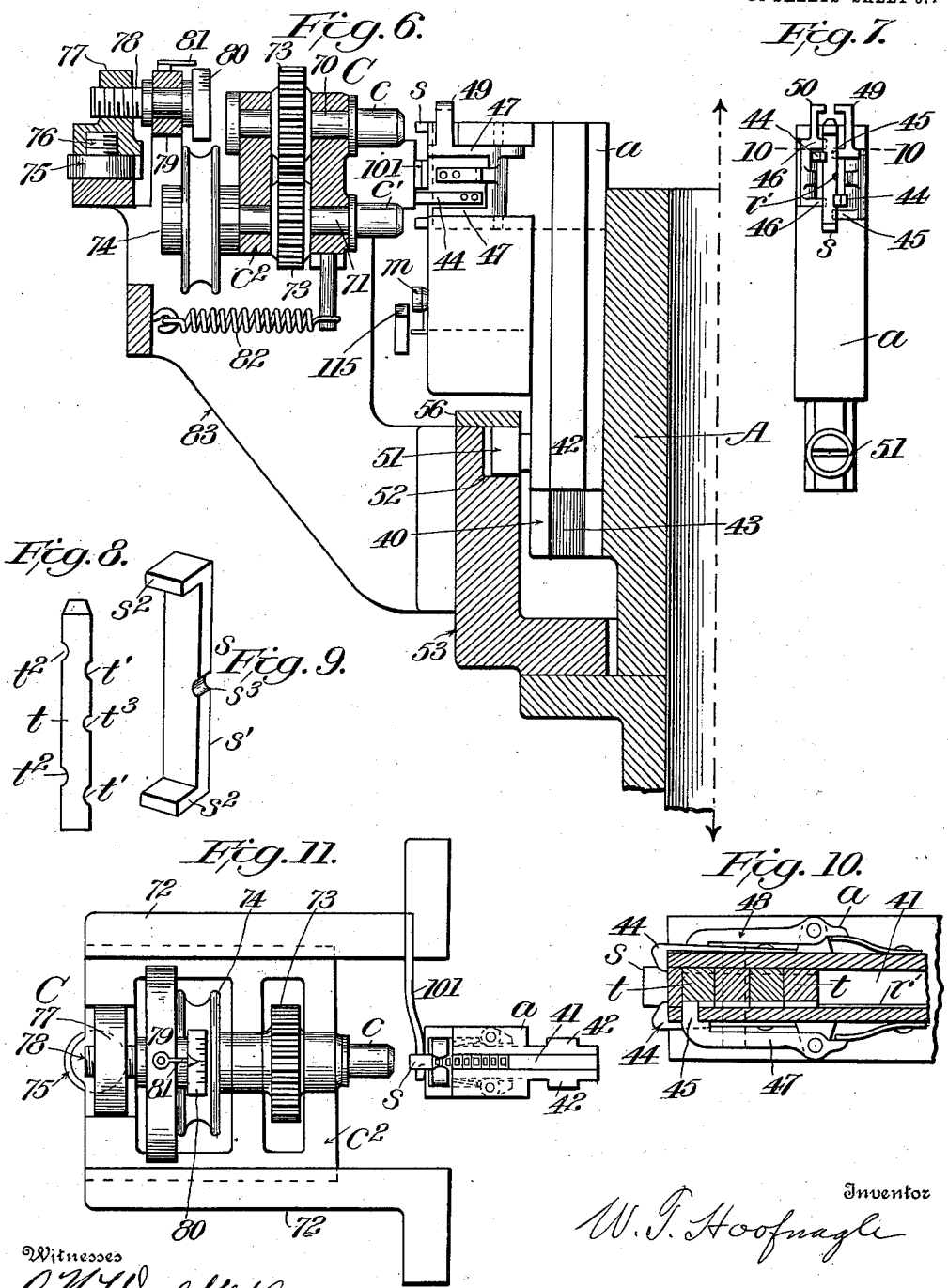

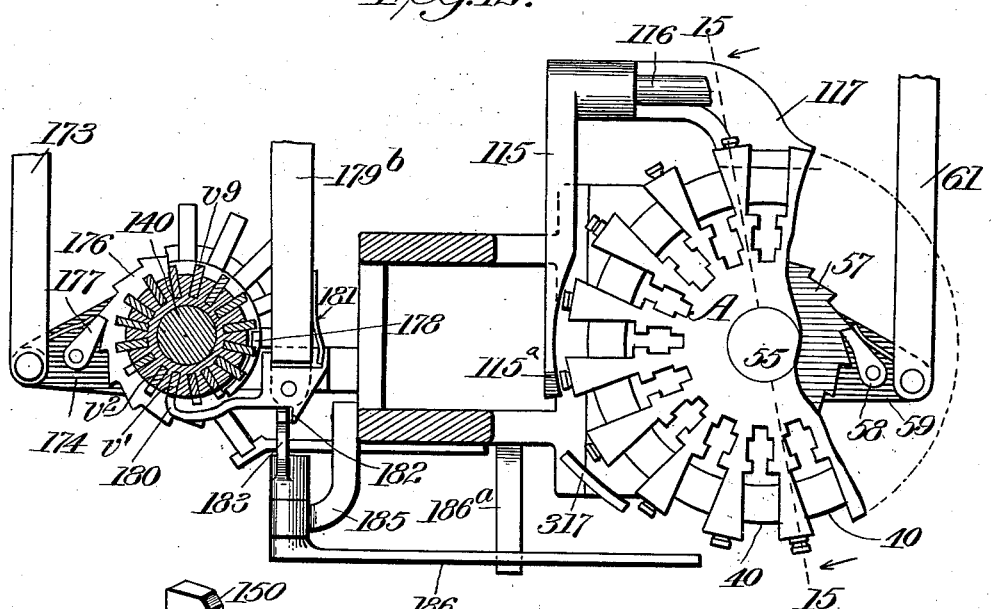

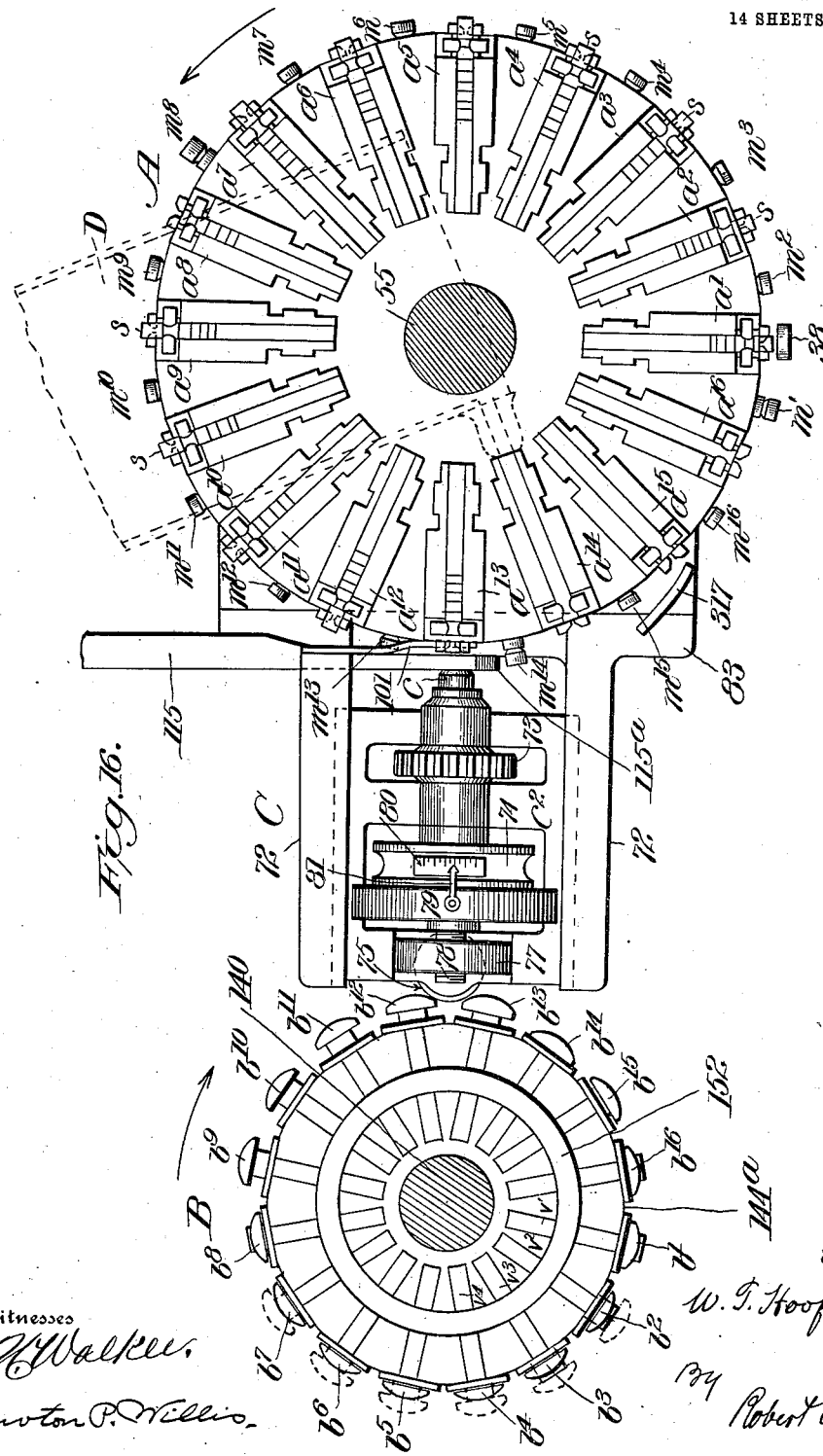

W. T. HOOFNAGLE.
MACHINE FOR JUSTIFYING LINES OF TYPE.
APPLICATION FILED FEB. 10, 1909. RENEWED NOV. 28, 1911.
1,022,418.
Patented Apr. 9, 1912.
14 SHEETS—SHEET 9.
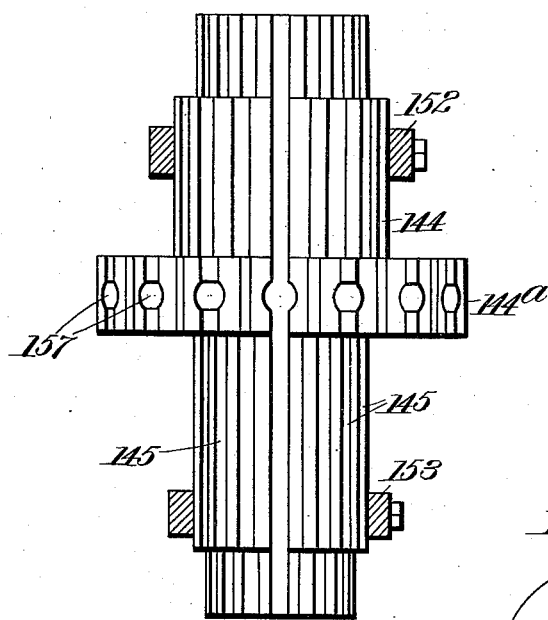
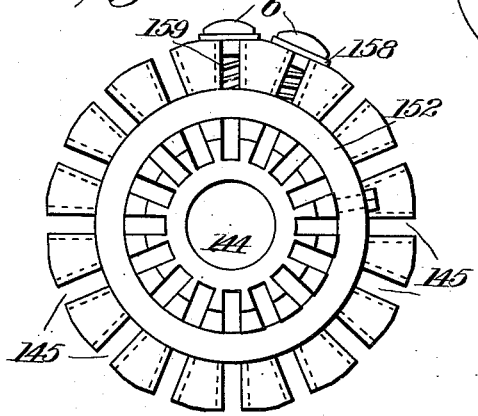
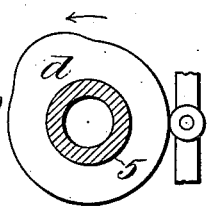
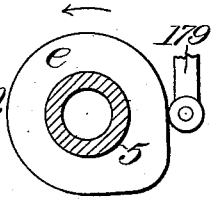
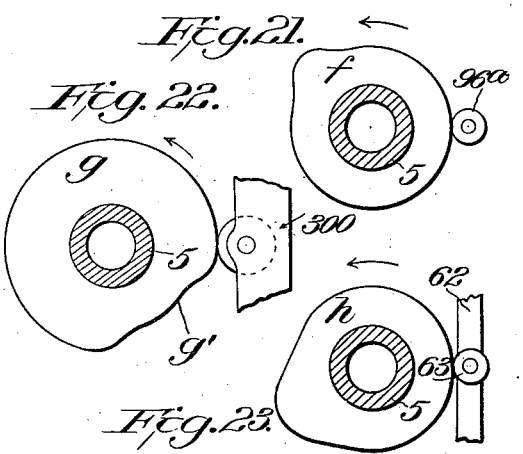
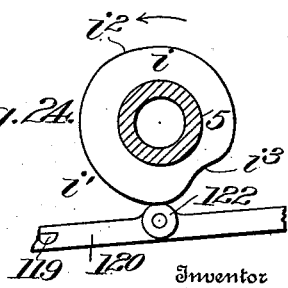

W. T. HOOFNAGLE.
MACHINE FOR JUSTIFYING LINES OF TYPE.
APPLICATION FILED FEB. 10, 1909. RENEWED NOV. 28, 1911.
1,022,418.
Patented Apr. 9, 1912.
14 SHEETS—SHEET 10.
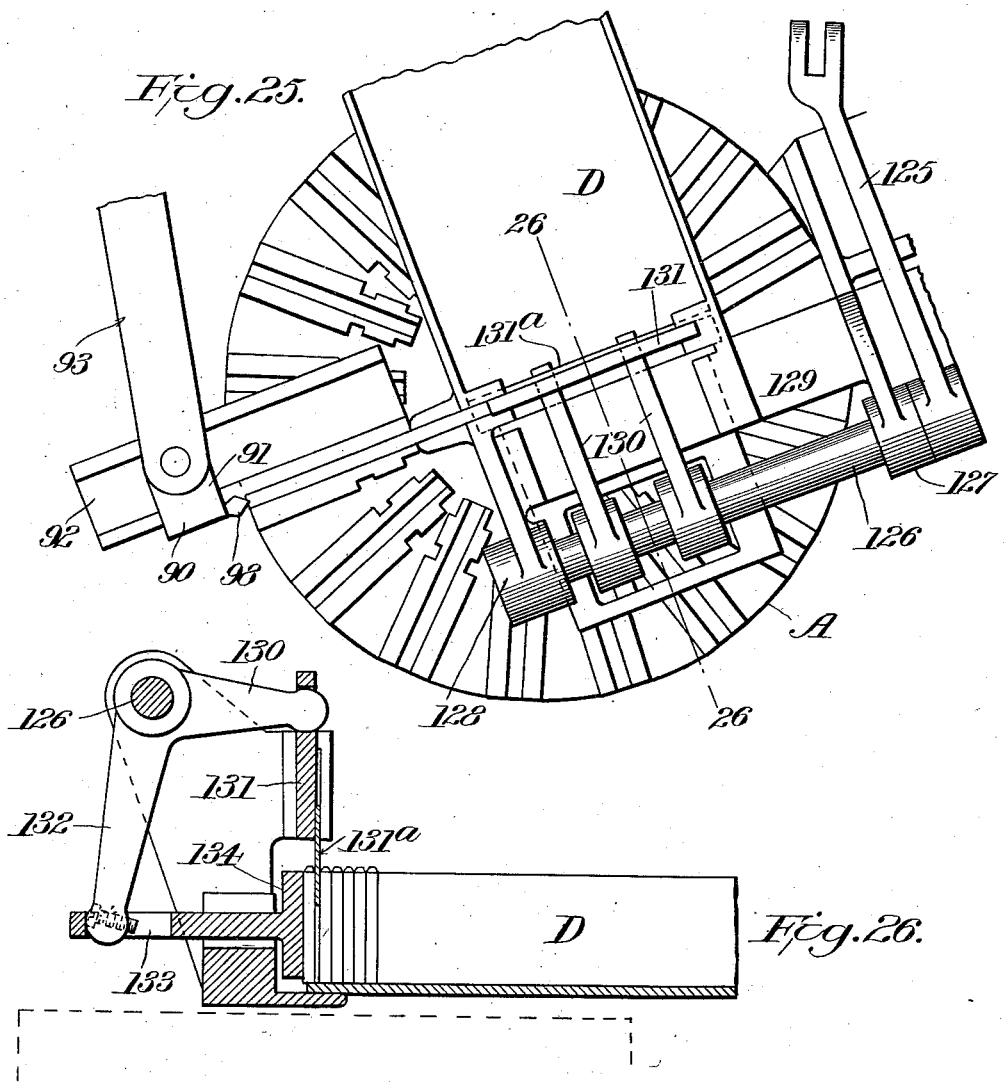

W. T. HOOFNAGLE.
MACHINE FOR JUSTIFYING LINES OF TYPE.
APPLICATION FILED FEB. 10, 1909. RENEWED NOV. 28, 1911.
1,022,418.
Patented Apr. 9, 1912.
14 SHEETS—SHEET 11.
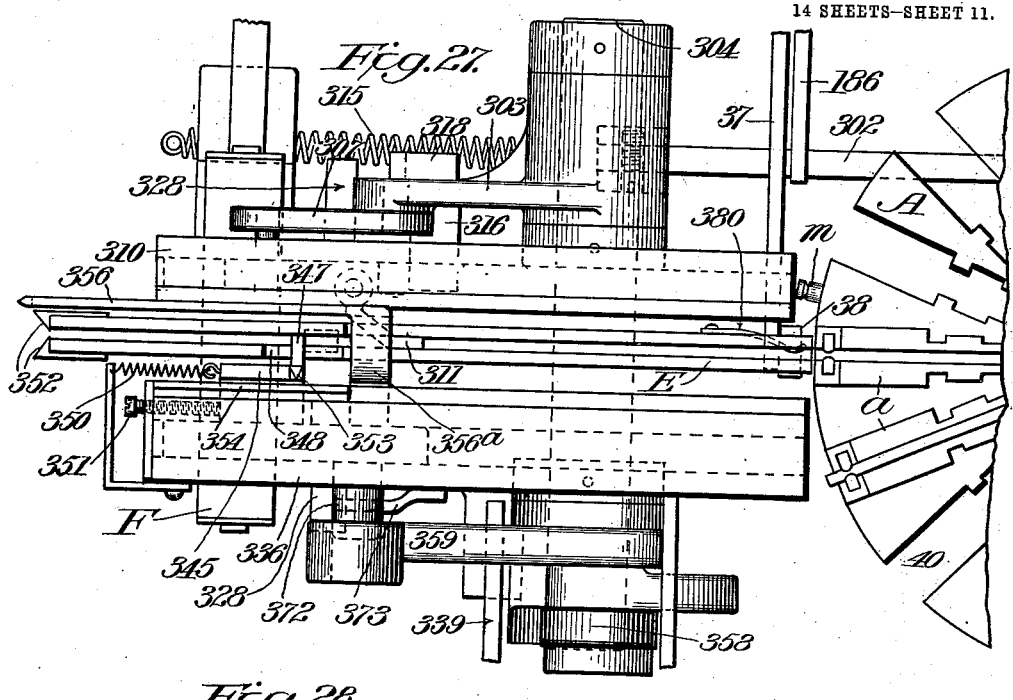
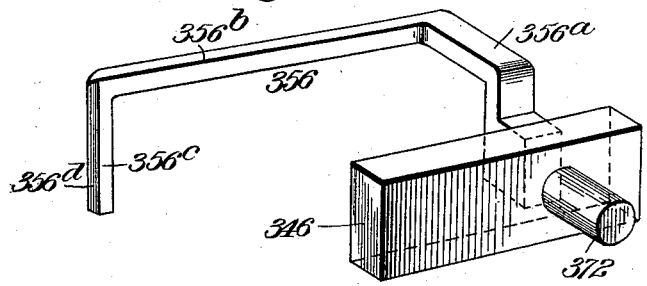
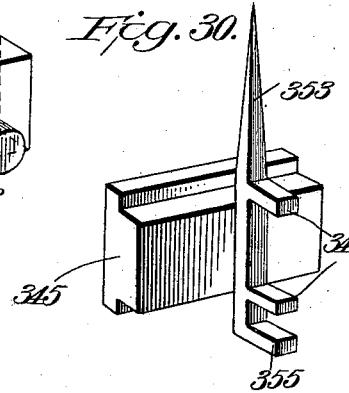
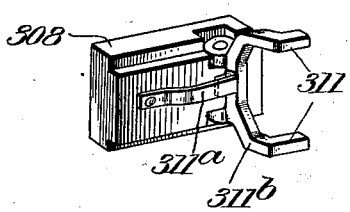
COLUMBIA PLANOGRAPH CO., WASHINGTON, D. C.

W. T. HOOFNAGLE.
MACHINE FOR JUSTIFYING LINES OF TYPE.
APPLICATION FILED FEB. 10, 1909. RENEWED NOV. 28, 1911.
1,022,418.
Patented Apr. 9, 1912.
14 SHEETS—SHEET 12.
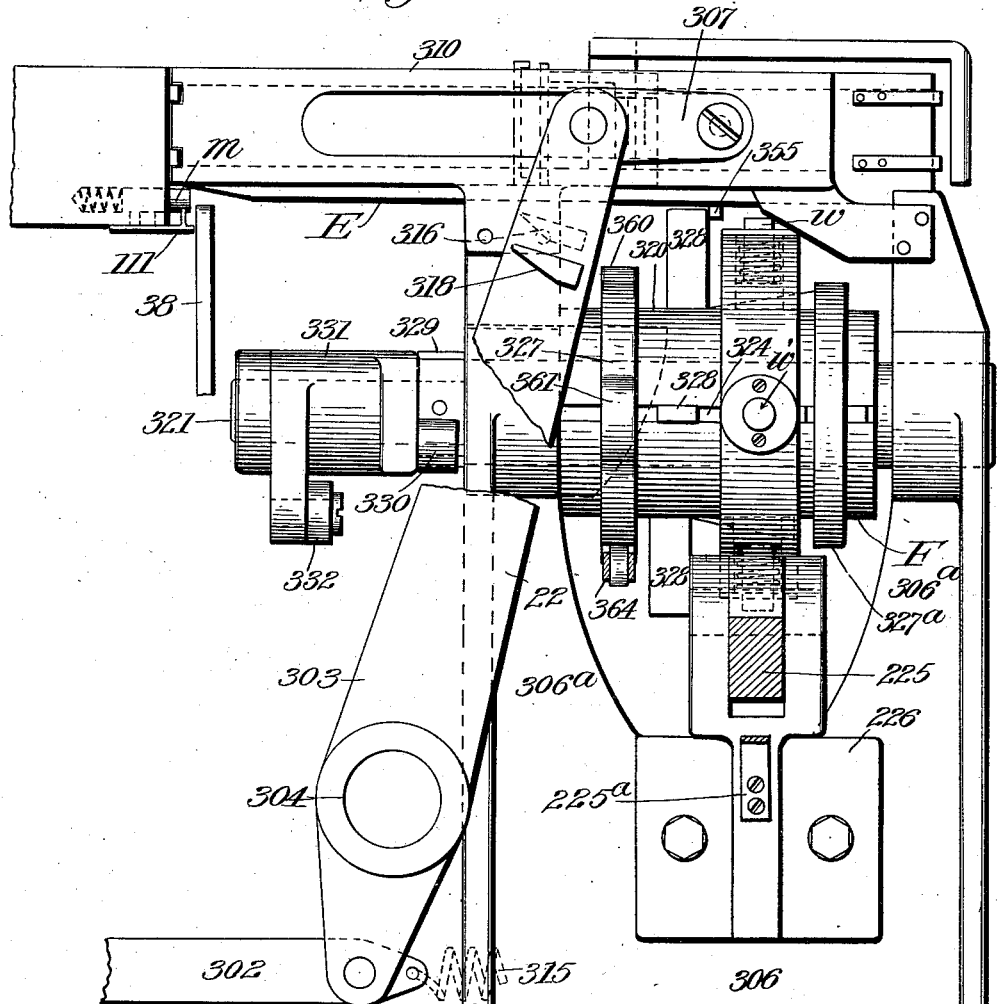
Fig. 31.
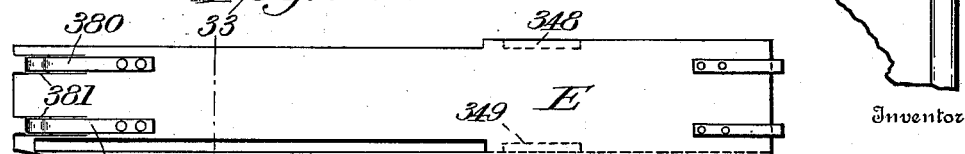
Fig. 32.
Fig. 33.
Witnesses
Inventor
W. T. Hoofnagle
Robert Watson
Attorney

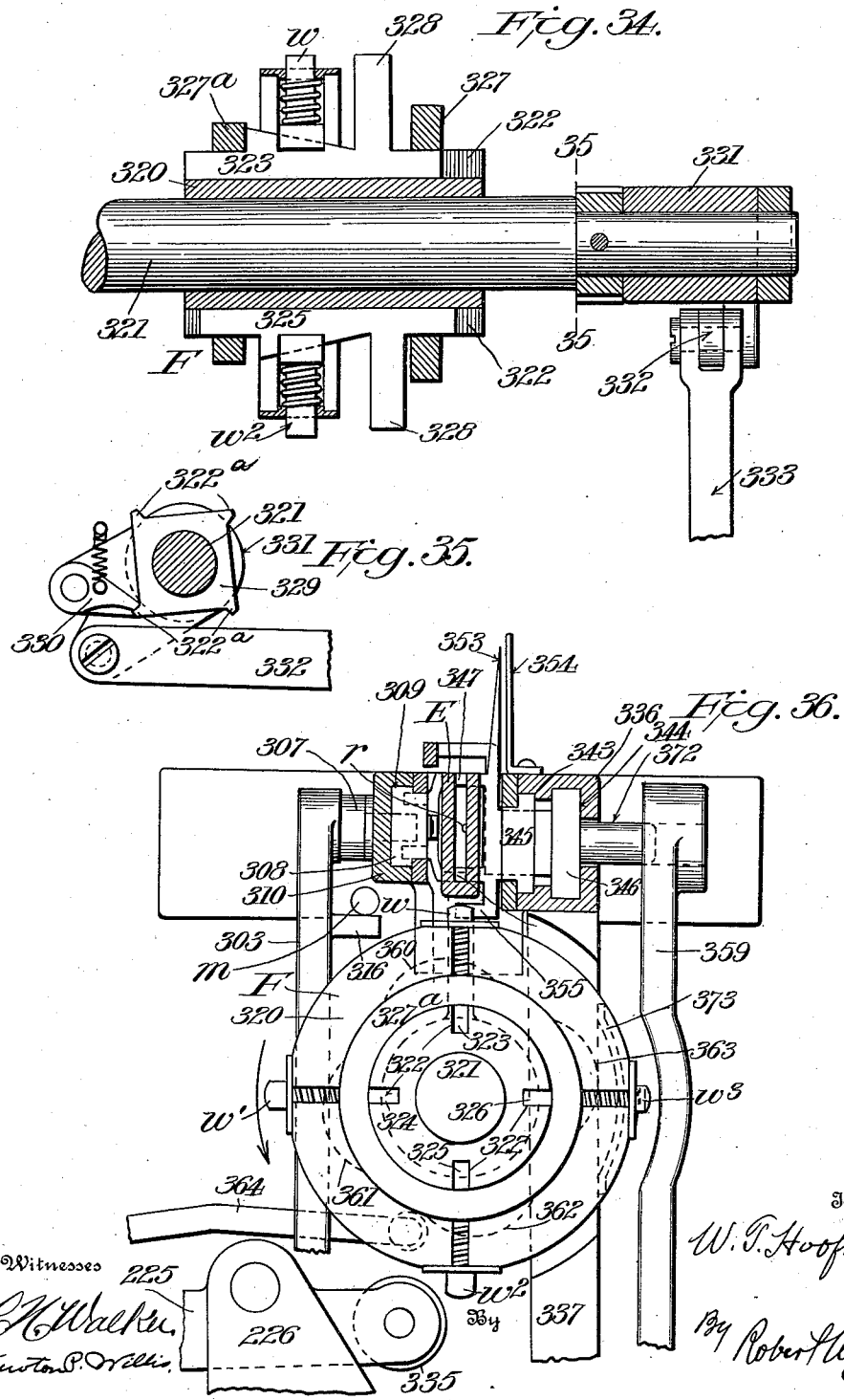

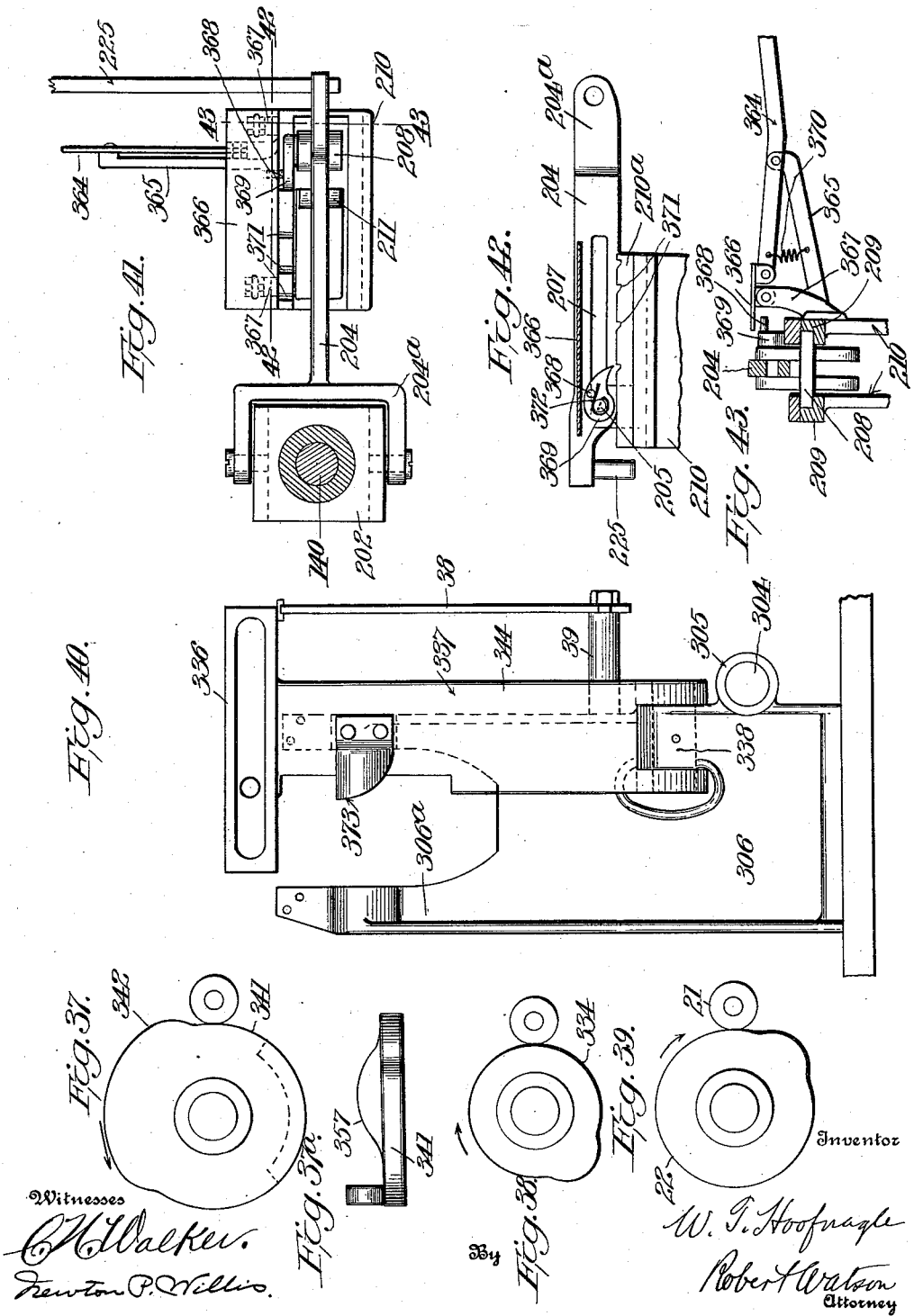

UNITED STATES PATENT OFFICE.

WILLIAM T. HOOFNAGLE, OF BLOOMFIELD, NEW JERSEY, ASSIGNOR OF ONE-HALF TO ROBERT WATSON, OF WASHINGTON, DISTRICT OF COLUMBIA.

MACHINE FOR JUSTIFYING LINES OF TYPE.

1,022,418.     Specification of Letters Patent.     Patented Apr. 9, 1912.

Application filed February 10, 1909, Serial No. 477,190. Renewed November 28, 1911. Serial No. 662,943.

*To all whom it may concern:*

Be it known that I, WILLIAM T. HOOFNAGLE, a citizen of the United States, residing at Bloomfield, in the county of Essex and State of New Jersey, have invented certain new and useful Improvements in Machines for Justifying Lines of Type, of which the following is a specification.

This invention relates to improvements in machines of the kind described in my Patent Number 912,961, dated February 16, 1909, for justifying and composing lines of type.

In the operation of the machine of my prior patent, the type for the successive words of a line are delivered into a series of word holders each holder adapted to receive the type for one word of a line and a justifying space. These holders are mounted in a rotary word carrier, and a rotary gage carrier is provided with adjustable gages corresponding in number to the holders in the word carrier. For each justifying space inserted in a word holder a gage is selected and when the type for an entire line has been filled into successive word holders the selected gages are adjusted according to the length of the line and the number of justifying spaces in the line. These carriers rotate, step by step, in opposite directions, and between them is arranged a space regulating device which is adjusted by the gages to regulate the width of the justifying spaces in the holders to properly justify the line. After the holders have passed the space regulating device the type are ejected from the holders and assembled in a line in a galley.

The machine of the prior patent above referred to is arranged for use in connection with a suitable type casting or type selecting mechanism, controlled by a key-board, and adapted to cast the type and spaces, or select the same from suitable magazines and deliver them directly into the word holders. The machine is arranged so that each time the justifying space key on the key-board is operated to insert a justifying space in a word holder, the mechanism will start into operation, and the word and gage carriers will move one step and then stop, and each time the line key or lever is operated, after the type for the last word of a line is inserted in a holder, the machine will start into operation and the carriers will make one step and then stop. This starting of the carriers at each operation of the justifying space key necessitates some delay in operating the key-board, as the type cannot be inserted in the word holders except when the word carrier is stationary, and some care is required on the part of the operator to avoid delivering type to the machine while the carriers are in motion, or while there is no word holder opposite the delivery point.

The purpose of my present invention is to provide means whereby the operation of casting or selecting type and delivering them to the machine may go on continuously until a complete line has been delivered, thereby avoiding the delay and the exercise of care on the part of the operator, above referred to. In the machine of my present application, a line of type, with justifying spaces of maximum size, may be delivered into the machine as fast as the operator can manipulate the key-board of the type casting or selecting mechanism. This line of type, preliminarily assembled in a line holder, is measured therein, and after its measurement has been registered on one of a series of line gages, a line lever is operated and mechanism is set in motion to feed the type for the words of the line, with justifying spaces, into successive word holders, and when the line has been fed to the holders and gages on the gage carrier have been selected for the justifying spaces in the line, the mechanism automatically stops. During this automatic operation of feeding the type of one line to the word holders, the operator continues to deliver a succeeding line into the line holder wherein the line is preliminarily assembled and measured. Thus, after causing the line of type to be delivered into the line holder, and after operating the line key to set the mechanism in motion, the operation of setting up a new line in the line holder may be proceeded with and the other operations on the preceding line go on automatically without requiring care on the part of the operator or causing any delay between the operations of casting or selecting the type for successive words.

In the machine of my earlier patent, as a convenient means for indicating and registering the line measurement, it was contemplated to connect the line measuring device with the key-board and to preferably use type and spaces, each some multiple of a given unit in width, so that upon the operation of the keys the total length of the line would be indicated upon a dial and a line gage would be set to register the line measurement directly by the keys on the keyboard.

In my present improvements I have provided line measuring devices independent of the key-board and it is immaterial whether the type and spaces are multiples of a given unit, in width, or not. The line lever will, of course, be extended to some point convenient to the operator at the key-board; but no mechanical connections are required between the type and space keys and the measuring or other operating devices of the present machine.

Figure 1 is a top plan view of a machine embodying my invention, the bracket which supports the upper end of the word-gage carrier being broken away; Fig. 1ª is a detail view of one of the clutches for connecting the operating mechanism with the driving shaft; Fig. 2 is a front elevation of the machine, the extreme upper portions being omitted; Fig. 3 is a side elevation, looking from right to left, in Fig. 1; Fig. 4 is a side elevation, looking from left to right, in Fig. 1, many of the parts being omitted; Fig. 4ª is an enlarged side view of the ratchet mechanism for operating the vertical cam rod; Fig. 4ᵇ is a detail of the tripping device for said ratchet mechanism; Fig. 5 is a vertical section taken centrally of the shafts of the word and space gage carriers; Figs. 5ª, 5ᵇ and 5ᶜ are details of the pawls connected with the clutch member on the space gage carrier, illustrating the operation of the same; Fig. 6 is a vertical section through the center of the trimming device and a portion of the word carrier; Fig. 7 is a front elevation of one of the word holders; Fig. 8 is a side view, on an enlarged scale, of one of the types; Fig. 9 is a perspective view, on an enlarged scale, of one of the justifying spaces; Fig. 10 is a horizontal section, on an enlarged scale, through one of the word holders, on the line 10—10 of Fig. 7; Fig. 11 is a top plan view of the trimming device and one of the word holders; Fig. 12 is a section through the space gage carrier and cutter frame, showing also the word carrier wheel in top plan view, the section being taken on the line 12—12 of Fig. 5, parts being broken away to show the ratchet wheels, and some of the parts being omitted; Fig. 13 is a perspective view of one of the wedges on the space gage carrier; Fig. 14 is a detail view of one of the gage pins; Fig. 15 is a vertical section through the word carrier wheel taken on the line 15—15 of Fig. 12; Fig. 16 is a top plan view of the space gage carrier, cutter frame and word carrier; Fig. 17 is a side elevation of the sleeve in which the space gages and gage pins are mounted; Fig. 18 is a top plan view of said sleeve; Figs. 19 to 24, inclusive, are sectional views taken through the sleeve on the main shaft, showing the several cams connected thereto; Fig. 25 is an enlarged plan view of the line advancing mechanism; Fig. 26 is a section through the same on the line 26—26 of Fig. 25; Fig. 27 is a top plan view of the line holder, line measuring device and the mechanism for feeding the lines of type to the word holders; Fig. 28 is a perspective view of the slide for transferring the assembled line of type to the feeding mechanism; Fig. 29 is a similar view of the slide and pusher for feeding the type to the word holders; Fig. 30 is a similar view of the slide, stop and pointer for indicating the over-set of the line and for moving the wedges on the line-gage carrier; Fig. 31 is a side elevation of the line-holder, line-gage carrier and adjacent parts, looking from left to right in Fig. 1; Figs. 32 and 33 are, respectively, side and cross sectional views of the line-holder; Fig. 34 is a vertical longitudinal section through the line-gage carrier; Fig. 35 is a section on the line 35—35 of Fig. 34, showing the ratchet mechanism for turning the line-gage carrier; Fig. 36 is a front view of the line-gage carrier and adjacent parts, the line holder being shown in section; Figs. 37 and 37ª are side and top views of the cam wheel for operating the mechanism for transferring an assembled line from the front to the rear of the line holder; Fig. 38 is a side view of the cam for rotating the line-gage carrier; Fig. 39 is a side view of the cam for releasing the mechanism which operates the word and space gage carriers and the feeding devices; Fig. 40 is a side view of the support for the line holder and of the swinging arm which carries, at its upper end, the movable guide-way for the slides shown in Figs. 28 to 30, showing also the lever which is tripped by an index pin on the word carrier to stop the mechanism; Fig. 41 is a top plan view of the justifying lever and adjacent parts; Fig. 42 is a section on the line 42—42 of Fig. 41; and Fig. 43 is a section on the line 43—43 of Fig. 41.

Referring to the plan view, Fig. 1, of the drawing, A indicates a rotary word carrier, having a series of holders each adapted to receive the type for one word of a line, and a justifying space; B indicates a rotary gage carrier having a series of gages corresponding in number to the number of holders in the word carrier, and C indicates a space trimming device adapted to trim the justifying spaces in the word holders, the position of the trimmer being controlled by the adjustable gages in the gage carrier.

These devices A, B and C are substantially the same as shown and described in my prior patent.

In the machine of the present application the type and justifying spaces for a line are delivered from a type casting machine or a type setting machine into a line holder E which is shown directly in front of the word carrier. The justifying spaces are of maximum width and the line is over-set and measured in the forward end of the line holder. The line holder is shown on an enlarged scale in Figs. 27, 31, 32, 33 and 36. The oversetting of the line is registered by the adjustment of a wedge in a rotatable line gage carrier F, arranged beneath the line holder. This gage carrier is shown in detail in Figs. 31, 34, 35 and 36. After the measurement of the line has been registered on the line gage carrier F, the mechanism is started into operation by the depression of a line lever L, shown at the right in Fig. 1, and the line of type is transferred to the rear portion of the line-holder, the word carrier A is moved step by step to bring successive word holders in line with the line holder, and the line of type is fed automatically into the word holders, each holder in succession receiving the type for one word of a line and a justifying space, except the holder for the last word of the line which receives only the type for that word, there being no justifying space after the last word in the line. While the type for one line are being fed into the word holders, the holders containing the type and spaces for the previously fed line are being carried past the trimming device C where the spaces are trimmed to justify the line, after which the type and trimmed spaces are transferred to the galley D, and during these movements the operator continues to set up another line in the forward part of the line holder E. The gage carriers B and F, coact to adjust the trimming device for each line so that it will trim the spaces which are held in the outer ends of the holders, to the proper width to justify the lines.

The construction and operation of the mechanism for preliminarily measuring the line in the line holder E, and the mechanism for automatically feeding the line of type to the word holders will be described in detail, after the other parts of the mechanism have been described.

Referring to the drawings, 1 indicates a suitable bed-plate upon which the machine is mounted and 2 indicates a driving shaft which is journaled in standards 3 and 4, secured to the bed-plate. The shaft 2 extends through a sleeve 5, which sleeve has secured to it cam wheels $d$, $e$, $f$, $g$, $h$ and $i$, shown in detail in Figs. 19 to 24, inclusive, and a brake-wheel $j$, the cam wheels being adapted to operate various parts of the mechanism. This sleeve is normally held stationary by a spring roller $k$ which engages a depression in the brake-wheel $j$. The shaft 2 is constantly driven through the medium of a pulley 6 and it has, secured to it, a collar 7 provided with a recess or opening $7^a$ adapted to be engaged by a spring pressed clutch pin 8 mounted in the cam wheel $d$ (see Figs. 1, $1^a$ and 2). Normally the clutch pin is held out of the recess by a tapering finger 9 secured upon a sleeve 10 which rocks upon a stud projecting from the standard 3. When the sleeve 10 is rocked in one direction the finger 9 is moved out from under the head of the clutch pin, allowing the latter to engage the collar 7 so as to connect the sleeve 5 with the driving shaft 2. When the finger is released it is returned by a spring 11 to its normal position and the head of the clutch pin then engages the tapering end of the finger and the pin is withdrawn from the recess in the collar 7, thereby disconnecting the sleeve 5 from the main shaft. Any suitable form of clutch may be used. The clutch here shown is of a type commonly used in wheel presses and other forms of machinery. The rocking sleeve 10 has a forwardly projecting stud or pintle 12 by the depression of which the clutch finger may be moved, against the action of the spring 11, to release the clutch pin and connect the shaft to the sleeve 5. This connection of the sleeve 5 with the shaft 2 occurs only, in the present invention, after an overset line of type has been inserted in a line holder E, which receives the type from the type casting or type selecting mechanism.

In order to start the sleeve 5, with the cams thereon, into operation, a rock shaft 13 is arranged in a suitable supporting bracket 14 and provided with a laterally extending arm 15 which projects over the arm 12 on the sleeve which supports the clutch finger. A spring 16, on the shaft 13, tends to normally hold the arm 15 out of engagement with the arm 12. An upright 17 on the rock shaft is connected by a link 18 (Figs. 1, 2 and 3) to a lever 19 pivotally mounted on a stationary rod 20 at the opposite side of the machine, said lever having a roller 21 which bears upon a cam 22 secured to a shaft 23 which is normally stationary and mounted in suitable bearings in standards 24. The shaft 23 has, secured to it, a collar 25 in which is mounted a clutch pin 26 adapted to engage a recess in a constantly driven pulley 27 loosely mounted on the shaft 23. This clutch pin is normally held out of engagement with the loose pulley by a finger 28 pivoted in a suitable support 29 and having a laterally extending arm 30 adapted to be depressed by the free end 31 of the line lever L. The clutch finger is normally held in position to engage the clutch pin by a spring 32, connected to a rod 32ª which is supported in the standards 24.

It will be seen, by following the connections just described, in the plan view, Fig. 1, that the release of the clutch pin 26 by the line lever will connect the shaft 23 with the constantly driven pulley 27 and the cam 22 on the shaft, (the form of which is shown in Fig. 39) will move the lever 19 and link 18 to the right, thus rocking the shaft 13 so as to cause its arm 15 to throw out the clutch finger 9 and thereby allow the clutch pin 8 to operate and connect the sleeve 5 with the constantly driven shaft 2. The line lever, it will be understood, is released as soon as the shaft 23 is clutched to the driving pulley 27, and as the spring 32 instantly draws the clutch finger 28 back to normal position, the clutch pin 26 will be drawn out after the shaft 23 has completed one revolution, and said shaft will then stop. The sleeve 5, however, remains clutched to the shaft 2 after the shaft 23 has stopped, and until all of the type for a line have been transferred from the rear part of the line holder to successive word holders. To maintain the sleeve 5 in operation until this result is accomplished, the rock shaft 13 is locked after it has been moved by the lever 19 and link 18 to release the clutch finger 9. As shown in Figs. 1 and 2, the rock shaft 13 has a laterally projecting pin 33 having a beveled end which slides over a tooth 34 on a detent lever 35 when the rock shaft is turned to move the clutch finger out of engagement with the clutch pin. The detent lever is pivoted at its lower end in a suitable bearing 35ª and is pressed toward the pin 33 by a spring 36, the arrangement being such that after the pin passes the tooth on the lever, the rock shaft will be prevented from being returned to normal position by the spring 16 until the detent lever is moved to release the pin 33. This movement of the detent lever takes place after the last word for a line has been delivered into the word holders, through the medium of a link 37 connected to the detent lever and to a lever 38, Figs. 1, 2, 3, 27, 31 and 40, suitably pivoted at its lower end to a bracket 39 (Fig. 40) extending from the upright support 306 which carries the line holder, said lever 38 projecting upwardly beneath the line holder and immediately in front of the word carrier. This lever 38, after the type for the last word of a line have been inserted in a word holder, and the word carrier makes its next movement, is engaged by one of a series of index pins $m$ upon the word carrier and moved so as to pull the detent lever to one side and release the rock shaft 13, which in turn permits the clutch finger to move to normal position and throw out the clutch pin 8 thereby stopping the sleeve 5 and the cams thereon. The index pin is set to trip the lever 38 by the feeding mechanism as will be hereinafter more fully explained, when the type for the last word of a line have been inserted in a word holder.

*Justifying spaces and type.*—Figs. 8 and 9 illustrate, respectively, the preferred form of type and justifying space used in the present machine. The type $t$ and also the quod spaces are formed with notches $t'$ and $t^2$ on opposite sides near their upper and lower ends and also with a notch $t^3$ in one side at the center. The justifying spaces, $s$, have only one notch $s^3$, in one side, at the center, corresponding in location to the notch $t^3$ in the type and quod spaces. Each justifying space consists of a body portion $s'$, whose width is equal to, or slightly less than, the width of the smallest justifying space ordinarily used in a line of type, and two lateral projections $s^2$ at the ends, the total width of the space, including the body and lateral projections being equal to the width of the largest justifying space ordinarily used in a line. The width of each type and space is preferably some multiple of a given unit, although that is not essential in this machine.

*Word holders and carrier.*—The word carrier A is provided with a sufficient number of holders to carry the type for more than one line, and while the type for one line are being fed into the word holders the type for a preceding line are being moved past the trimming device, where the spaces are trimmed. Each word holder has a type channel of sufficient length to receive the type for the longest word that is apt to be used and it is also provided with means for locking a justifying space in one end of the channel. The type fit closely within the channels of the word-holders and may be held upright by the frictional engagement of the sides of the type with the walls of the channels; but preferably the type and spaces are held upright by providing a rib $r$ in the line holder (Fig. 36) which engages the notches $t^3$ and $s^3$ in the type and spaces, similar ribs $r'$ being provided in the word holders, as shown in Figs. 3 and 7. In the drawing sixteen word-holders, $a'$ to $a^{16}$, inclusive, (Fig. 16) are shown. These word holders fit into the same number of radial slots, 40, (Figs. 6 and 12) in the carrier A. Each word holder, as shown in Figs. 6, 7, 10 and 11, consists of a body $a$ adapted to fit within a radial slot 40 in the carrier and having in its upper end a type channel 41 which is open at both ends so that the type can be inserted into the channels at one end and ejected from the other. The word-holders are adapted to slide vertically in the guide slots 40 and they are prevented from moving radially in the carrier wheel by shoulders 42, on the word-holders, which fit into corresponding recesses 43 in the guide slots. When the word holders are in position in the carrier wheel the type channels 41 are radial to the axis of the wheel. At the outer end of each type channel is arranged a pair of spring detents 44 which project partly across the entrance to the channel and these detents are provided with beveled heads, as shown, so that the type and spaces when pressed into the channel will spread the detents apart. These detents prevent the type and spaces from falling out of the outer or receiving ends of the channels. Immediately in the rear of the heads of the detents, two pairs of stops 45 and 46, respectively, project into the channel. These stops are located so that they will be in line with the notches $t'$ and $t^2$ in the type bodies and quad spaces, and the type and quad spaces may, therefore, pass into the type channels without being impeded in their movement; but as the bodies of the justifying spaces are not notched, except at the center, the stops will prevent the justifying spaces from passing inward beyond the stops. The distance between the stops and the heads of the detents is only great enough to permit the body of a justifying space to enter therebetween, and when a justifying space is moved into the entrance of a channel it immediately becomes locked in position so that it can neither pass farther in nor fall out. The stops 45 and 46 are secured to spring-pressed arms 47 and 48, respectively, pivoted in recesses in the sides of the holder and parts 49 and 50, secured to said arms respectively, project upward and thence inward toward one another, above the type channel. As hereinafter explained, when the type are ejected from the rear or inner ends of the word holders into the galley, a spreader enters between the parts 49 and 50 and spreads the arms 47 and 48, and the stops thereon, apart, so that the justifying space may be moved past the line of the stops and transferred with the type to the galley.

Each word-holder has on its forward or outer side a roller 51 which rests upon a circular cam track 52 in a stationary cylindrical support 53 which is mounted upon a standard or bracket 54. The carrier wheel A is secured to a vertical shaft 55 which is journaled in the bracket 54. The cam track 52, commencing a little to the left of the line holder E and continuing around to the right for a little more than half a circle, is level and of the proper height to bring the channels in the word-holders on a level with the channel in the line holder, to receive the type. Commencing at points which are slightly to the left of a line passing through the axis of the carrier wheel and through the line holder channel, the track rises gradually, (Fig. 15) its highest point being $67\frac{1}{2}$ degrees to the left of the channel in the line holder, looking from front to rear. The galley D is arranged over the carrier wheel and extends rearwardly, as shown in Fig. 1. The rotation of the carrier wheel, in the direction of the arrow in Figs. 1 and 16, causes each word-holder, after passing the line holder, where it receives its type, to travel around on the low portion of the cam track until it has passed under the galley. After making a little more than a half revolution the word holder is raised by the cam surface of the track, which is at the left of the galley, and when the word-holder has made thirteen sixteenths of a revolution it will rest upon the highest point of the cam and its channel will be in line with the channel in the galley, so that the type may be ejected from the word-holder into the galley. The word-holder, in completing the last three-sixteenths of its revolution, will descend on the cam to the low, level part of the track before it reaches the line holder. As hereinafter explained the justifying spaces in the word-holders are trimmed to the proper width to justify the line after the holders have made three quarters of a revolution. A flange 56, on the support 53, overhangs the cam portion of the track, forming a groove in which the rollers on the word-holders travel.

The step by step movement of the word-carrier A is accomplished by means of a ratchet wheel 57 (Figs. 3, 5 and 12) which is secured to the shaft of the carrier wheel and operated by a pawl 58 mounted upon an arm 59, secured to a collar 60, which turns on the hub $59^a$ of the ratchet wheel. The collar 60 is oscillated by a link 61, pivotally connected to the arm 59 and to a lever 62 which carries a roller 63 arranged to bear upon the cam wheel $h$ (Figs. 1, 3 and 23) on the sleeve 5. The lever 62 is journaled upon a rod 64 which is supported by arms $3^a$ and $4^a$ projecting from the standards 3 and 4, respectively.

The ratchet wheel 57 has as many teeth as there are holders in the word carrier, in this instance, sixteen teeth. The cam $h$ on the sleeve 5 is formed so that each revolution of the cam will cause one oscillation of the lever 62, and thereby rotate the word carrier one step, equal to the distance between the channels of adjacent word holders. This movement of the word carrier takes place shortly after the commencement of each rotation of the sleeve 5 and cam $h$. Then, while the sleeve is completing its rotation, the word carrier remains stationary with one word holder in position to receive type from the line holder, and one holder containing type for a word of a preceding line, opposite the cutters on the trimming device C, as shown in Figs. 1 and 16, and if the word holder then in front of the cutters contains a justifying space, this space is trimmed to the desired size while the carrier is stationary.

In the side of the word carrier between the word holders is arranged a series of index pins $m$, one pin for each word holder. These pins are used to automatically trip the stopping lever and the mechanism for advancing the lines in the galley, as later described.

The trimming device C comprises a pair of constantly driven cutters, $c$ and $c'$ adapted to be moved into engagement with the lateral projections on the justifying spaces. These cutters, as shown in Figs. 6, 11 and 16, are upon the ends of spindles 70 and 71 which are arranged radial to the axes of the carriers A and B in a cutter slide $c^2$, movable in guideways 72. The spindles are connected by intermeshing gears 73 of equal diameter and are driven by a belt applied to a pulley 74. A roller 75 is arranged at the rear of the slide upon a stud 76 which is threaded into a crosshead 77 movable in guide-ways in the cutter slide. An adjusting screw 78 journaled in a cross-piece 79 on the cutter slide, is threaded into the cross head 77 and adapted to adjust the latter and the roller 75 with respect to the slide. The adjusting screw has a scale 80 upon its head, as shown, and a hand or pointer 81, fixed to the cross-piece 79, serves as a guide to the eye in setting the adjusting screw. A spring 82 holds the roller 75 on the cutter slide against gage pins $b'$, $b^2$, etc., on the measuring mechanism B, which gage pins have inclined or cam surfaces for advancing the cutter slide toward the word carrier A when the mechanism B is rotated, as more fully explained hereinafter. Normally the cutters are held out of the paths of movement of the projecting ends of the justifying spaces by the spring 82, but they are advanced at the proper times, when the carrier A is stationary, to trim the ends of the spaces. The guides 72 for the cutter frame are integral with a bracket 83 which is secured to the cylindrical support 53.

As before stated, when the mechanism is started into operation, the word holder moves intermittently until the type for the several words of a line, and the justifying spaces for that line, are delivered from the line holder into successive word holders, and the mechanism automatically comes to a stop after the holder containing the type for the last word of the line has moved one step to the right of the line holder. The same movements bring the holders containing the type and spaces for the preceding lines successively in front of the cutters on the trimming device. The gage carrier B is rotated one step after each movement of the word carrier and a series of gage pins on the gage carrier B, corresponding in number to the justifying spaces in this preceding line, and adjusted according to the line measurement and the number of justifying spaces, by the mechanism hereinafter described, move in succession past the roller on the rear end of the cutter frame during the intervals when the carrier A is stationary, the successive gages advancing the cutter for trimming the spaces in successive word holders to the proper width to justify the line. This trimming operation on each justifying space occurs one step before the word holder reaches the highest point on the cam track 52. After moving one step beyond the trimming device, the channel in each word holder comes in line with the channel in the galley G and the type are then transferred from the holder through the rear or inner end of the channel into the galley by means of an ejector 90 (Figs. 1, 2, 5 and 25) which is attached to a guide 91 movable in a guideway 92 parallel with the channel in the galley, said guide being pivotally connected to a lever 93 mounted upon a vertical shaft 94 which is journaled in a bracket 95. An arm 96 on the lower end of the shaft 94 has a roller 96$^a$ which bears against the cam $f$. A spring 97 holds the roller against the cam and also holds the ejector 90 normally out of the path of movement of the word-holders. A spreader 98 (Figs. 1, 2, 5 and 25), upon the ejector 90 enters between the upward projections 49 and 50 on the spring arms which carry the stops 45 and 46 and spreads the stops apart before the ejector 90 enters the channel in the word-holder or engages the justifying space at the entrance of the channel. The stops being moved out of the way, the ejector then transfers the justifying space, if there be one, and the type for the word, from the holder into the galley.

In order to hold the spaces firmly against the stops 45 and 46, while being acted upon by the trimming device, a heavy spring arm 101 (Figs. 6, 11 and 16) is arranged upon one of the guideways for the cutter and bears against the periphery of the carrier wheel and is adapted to press against the body of the justifying space and hold the same firmly against the stops 45 and 46 when the holder is directly opposite the cutters.

*Feeding devices.*—The cam $g$ on the sleeve 5 operates mechanism for automatically moving the type from the line holder into the word holders. The form of this cam is shown in Fig. 22. A lever 300, journaled upon and depending from the rod 64 has a roller adapted to bear upon the cam, and a link 302 connects the lower end of this lever with the short arm of a lever 303 (Figs. 1, 2, 3, 5, 27, 31 and 36). The lever 303 is journaled upon a short shaft or rod 304 which is secured in a bracket 305 at the rear of the standard 306 which supports the line holder (Fig. 40). A link 307 connects the upper end of the lever 303 with a slide 308 (Figs. 27, 29 and 36) which is movable in the channel 309 of a guide 310 which is arranged parallel with the line holder and supported upon the same standard 306. The slide 308 has pivotally connected to it a pair of forked arms 311 which are held by a spring 311ᵃ so that the arms will normally project across the channel of the line holder as shown in Fig. 27. For this purpose, as shown in Fig. 32, one side of the line holder is provided with a slot 349 at the bottom of the channel and the upper edge of said side is cut off as shown at 348 so that the two arms 311 which constitute a pusher for the type may engage the type and spaces at their upper and lower ends. The arms 311 are inclined as shown at 311ᵇ so that when the line of type is moved from the forward end of the line holder to the rearward end, it will press the pusher laterally out of line with the channel, and after the line of type has passed by the pusher the spring 311ᵃ will return the pusher to its normal position. A line of type, after being measured in the forward part of the line holder, is automatically moved past the pusher 311 to the rearward part of the line holder by mechanism operated by the shaft 23, as hereinafter explained. When the line of type has moved past the pusher arm, and the pusher arm is moved toward the word carrier it will move the line of type in that direction. The link 302, for oscillating the lever 303, which operates the pusher, has a spring 315 (Figs. 1, 2, 3, 27 and 31), connected to its forward end, and this spring tends to pull the link 302 forward, so as to keep the roller on the lever 300 in contact with the cam g. This cam, as shown in Fig. 22, has a depression g', so that when the cam revolves the spring will pull the link 302 forward and rock the upper part of the lever 303 and the pusher arm 311 rearwardly so as to press the line of type, at the rear of the pusher arm, toward the word holders. Each rotation of the cam g causes the pusher to advance toward the carrier as far as the type in the channel will permit. Thus, assuming a full line of type to be between the pusher arm and the word carrier, the first rotation of the cam g will cause the pusher to move the line of type until the type for the first word in the line, and the first justifying space, is transferred from the line holder to a word holder. This justifying space will be locked at the entrance of the word holder by the stops therein and will stop the further movement of the remaining part of the line and the pusher arm which bears against it. This stoppage of the movement of the pusher will prevent the roller 301 on the lever 300 from following, except to a slight distance, the depression in the cam g. When the depression in the cam passes beyond the roller, the lever 300 will be rocked backward and the pusher arm 311 will be rocked forward to normal position, away from the line of type. At the next rotation of the cam the spring 315 will draw the link 302 forward and rock the pusher arm backward, against the column of type, and the type for the second word of the line and a justifying space will be placed in another word-holder. This space will stop the further movement of the pusher arm and the latter will be returned to normal position again after the depression on the cam passes the roller on the lever 300. At each rotation of the cam the pusher arm is advanced and the type for a word and a justifying space is inserted in a holder, the justifying spaces preventing more than the type for one word from entering the successive holders. The pusher advances farther toward the word carrier at each successive movement, the depression in the cam being deep enough to permit the pusher to move far enough to insert the type for the last word of a line into its holder. The pusher thus moves closer to the word holder as the type for successive words are placed in the holders. A projection 316, on the lever 303 which operates the pusher, strikes a spring detent 111 which releases an index pin m upon the word carrier and allows it to spring outwardly in a radial direction from the periphery of the carrier so as to be in position to engage and rock the lever 38 at the next step of the carrier. This lever is connected by the link 37 with the detent lever 35 which, as before explained, is adapted to lock and release the shaft 13 which controls the clutch pin 8. After the type for the last word have been inserted in a word holder, the index pin is released, the word carrier makes one more step to bring another word holder in line with the line holder and during this movement the index pin trips the lever 38 and causes the stoppage of the sleeve 5 and the cams thereon.

*Line advancing mechanism.*—When all of the type from the several holders for a line have been assembled in the galley, the justified line in the galley is advanced by mechanism operated by the cam i and controlled by the index pin following the holder for the last word of a line, which pin projects outwardly beyond the other pins during the greater part of the revolution of the carrier, and until it is pressed inward again by the cam 317 (Figs. 1, 12 and 16). A tripping lever 115 (Figs. 1, 2, 3, 5, 12 and 16) secured upon a shaft 116 at the rear of the carrier, extends to a point between the cutters and the ejector 90, and has at its free end a cam surface 115ª which is out of the path of movement of all of the index pins except the extended one following the last word holder for a line. This last index pin will engage the cam projection 115ª and depress the free end of the lever when the last word for a line has been transferred to the gallery and the shaft 116 will thereby be rocked. This shaft is mounted in a bracket 117, projecting from the rear side of the support 53, and in an upward projection 4ᵇ of the standard 4. A latch lever 118 (Figs. 1 and 3) is secured to the shaft 116 and extends downward to a point over a stop 119 upon a lever 120, which is pivoted at 121 in a rearward extension 4ᶜ of the bracket or standard 4. This lever 120 carries a roller 122 (Fig. 24) adapted to bear against the underside of the cam $i$. The roller is, however, normally held out of engagement with the cam by the latch-lever 118 which engages the stop 119 and it is normally pressed toward the cam by a spring 123 connected to the extension 4ᵇ of the bracket 4 and to a vertical shaft or rod 124 which connects the free end of the lever 120 with a lever 125 upon a rock shaft 126 arranged in front of the galley (Figs. 1, 3, 25 and 26) in bearings 127 and 128 in a bracket 129 which is secured to the cylindrical support 52. The rock shaft 126 carries two arms 130 which project rearwardly therefrom and are connected to a vertically movable slide 131, on which is mounted a thin flat metal piece 131ª of the width of the galley and which forms one side of the type channel in the galley. Two arms 132 extending downwardly from the rock shaft 126 enter a slot 133 in a slide or pusher 134 which, when the arms 132 are swung rearwardly advances the lines of type in the galley. When the rock shaft 126 is moved so as to cause the arms 130 to move upward, these arms lift the partition 131ª and the arms 132 then cause the slide 134 to advance the line of type, this latter movement taking place after the partition has been raised owing to the lost motion between the arms 132 and the sides of the slot 133. When the arms 130 are again rocked to the horizontal position the partition 131 moves downward into the galley and the slide 134 moves back, leaving a space or channel between the partition and the slide.

When the index pin adjacent to the holder for the type of the last word in the line engages the arm 115, which it does after the type for the last holder of the line have been transferred to the galley, the shaft 116 and latch-lever 118 are rocked, the latter moving away from the stop 119 and thereby allowing the roller on the lever 120 to engage the cam $i$. The rotation of the cam then causes the lever 120 to move downward and then upward, thus, through the link 124 and lever 125, causing the arms 130 and 132 to move the partition 131 and slide 134 to advance the line and form a new type channel in the galley. A spring 135 connected between the pin 136 on the rock shaft 116 and the bracket 4 normally holds the lever 118 against a stop 137. When the arm 115 is depressed by an index pin on the carrier the latch lever 118 is rocked rearwardly, or to the right, in Fig. 3, away from the stop 137, and out of line with the stop 119. At this time, the high part, $i'$, of the cam $i$, has passed beyond the roller 122 (Fig. 24), and a lower part of the cam which commences at about the point $i^2$ and continues around to the depression $i^3$ (Fig. 24) is opposite the roller. The lever 120 is thus allowed to rise sufficiently to bring the stop 119 up in front of the latch lever and thereby prevent the latch lever from swinging back to normal position until the lower portion $i^2$ of the cam and the depression $i^3$ have passed beyond the roller and the latter has again engaged the high part of the cam as shown in Fig. 24. While the latch lever is moved to release the lever 120 whenever an index pin, following the last holder for a line trips the lever 115, the lever 120 cannot operate the line advancing mechanism until near the end of the revolution of the cam $i$, when the depression $i^3$ in the cam permits the lever 120 to be drawn upward by the spring 123 and the cam then returns the lever to normal position just before the sleeve 5 completes its revolution. When the roller on the lever 120 rides out of the depression on to the high part $i'$ of the cam $i$ the stop 119 is below the end of the latch lever 118 and the latter is swung forward over the stop 119 by the spring 135, in which position it remains until the lever 115 is again tripped by an index pin following the last holder for a line. The cam $i$ rotates with the other cams on the sleeve, but performs no function except when the lever 115 is tripped, and then near the completion of the revolution of the cam the line is advanced in the galley.

*Justifying mechanism.*—This mechanism comprises the gage carrier F, having four gages which are adjusted, in succession according to the oversetting of the successive lines of type as they are inserted in the forward end of the line holder, and the gage carrier B, having gages corresponding to the number of holders in the word carrier. In the latter carrier sets of gages corresponding in number to the number of justifying spaces in the holders for a given line are adjusted simultaneously according to the oversetting of the line divided by the number of such spaces in the line. For convenience, the carrier F will be termed, in this specification, the line-gage carrier, and the carrier B will be termed the space-gage carrier.

The details of construction of the space-gage carrier are as follows: A shaft 140 is vertically arranged in a bearing 141 on the bed-plate, and in a bearing 142 at the upper end of a standard 143. Upon the upper end of this shaft is secured a long sleeve 144, (Figs. 17 and 18) having sixteen radial grooves 145 within which are arranged a corresponding number of similarly constructed wedges $v$, one of which is shown separately in Fig. 13. Each wedge is composed of a flat bar having on its outer or front edge, near its central portion, an inclined face 146. The upper end of the wedge is notched, as shown at 148, leaving a tooth 150 above the notch, and the lower portion of the wedge is cut away, as shown at 149, leaving a tooth 151 at the lower end of the wedge. Rings 152 and 153, secured to the ribs of the sleeve 144, extend around the wedges, above and below the inclined faces thereof, and hold the wedges within the slots in the sleeve. The diameter of the sleeve 144 is greatest near the center, as shown at $144^a$, and, before the slots are cut out in the sleeve, cylindrical openings 157 are bored in this enlarged portion to provide bearings or guideways for the gage pins $b'$ to $b^{16}$, inclusive, (Fig. 16). Each opening 157 is bisected by one of the radial slots. Each gage pin, as shown in Fig. 14, consists of a body 154 having at one end a fork 155 adapted to fit closely around the forward edge and sides of the inclined portion of a wedge, and a head 156 which is beveled or rounded off from the center toward both sides. Collars or caps 158 fit into the outer ends of the openings 157, and springs 159 are interposed between the collars and the forked ends of the pins to hold the latter in engagement with the inclined faces of the wedges. The wedges are held in any position of adjustment by the spring pressed pins.

The shaft 140 is turned one-sixteenth of a revolution each time the sleeve 5 revolves, by means of the cam wheel $d$ which actuates a lever 170, (Figs. 1, 2, 4, 5 and 12). This lever has one end journaled upon the bar 64 and the other end of the lever is connected to a link 173, the latter connecting the lever with an arm 174 (Figs. 2, 5 and 12) on a collar 175 which is journaled on the hub of a ratchet wheel 176, said ratchet wheel being secured to the shaft 140. A pawl 177 on the arm 174 engages the teeth of the ratchet wheel. This ratchet wheel has one tooth for each gage pin in the structure, or sixteen in all, and, therefore, each time the cam wheel $d$ makes one revolution the shaft 140 and the wedges and gage pins carried thereby are turned one-sixteenth of a revolution. The shaft 140 and gage pins turn in the opposite direction from the direction of rotation of the word carrier, as shown by the arrows in Figs. 1 and 16.

Normally the wedges $v$ are in their uppermost positions in the slots 145, their upper ends being adjacent to the bearing 142. If any wedge is pulled downward, it is automatically returned to its upper position by a stationary cam surface 178, (Figs. 5 and 12), projecting from the bracket 83, as the shaft revolves. This stationary cam is engaged by the lower surfaces of the teeth 147 on the wedges, and is located so that it will raise the wedges to their uppermost positions after the gage pins connected therewith have passed by the roller on the cutter slide and before the wedges reach the front of the machine. It will be evident that when a wedge is pulled downward from its normal position, the gage pin operated thereby will be forced radially outward by the inclined face 146 of the wedge, and when the wedge is moved upward the gage pin will be returned to its normal position by its spring.

Each time the sleeve 5, carrying the cam wheels, rotates the cam wheel $e$ operates a bell crank lever 179 (Figs. 1, 2, 3, 4 and 12) pivoted on the bar 64, said lever comprising an arm $179^a$ which engages the cam wheel and an arm $179^b$ which projects forward and has pivotally connected to its forward end, a finger 180, (Figs. 2, 4 and 12). This finger extends in front of the series of wedges and is adapted to engage the upper side of the tooth 147 of the wedge which may be at that time immediately at the left of the front of the shaft 140, as shown in Fig. 12. A spring 181 holds the finger in position to engage the tooth of a wedge.

Each time the cam wheel $e$ rotates, the bell crank lever 179 is reciprocated and the finger 180 engages the tooth 147 of a wedge and moves the wedge down a short fixed distance. If there are, say ten words in the line, nine justifying spaces will be inserted in successive word holders, and nine wedges $v$ will be moved down a short distance from their normal positions, in succession, by the finger 180. These selected wedges are afterward pulled farther downward, as will be hereinafter explained, so as to force the gage pins operated thereby outward to a distance controlled by the measurement of the type and spaces in the word holders and the number of justifying spaces in the holder for the line.

It is necessary to select only as many wedges as there are justifying spaces in the line, and, therefore, as there is no justifying space inserted in the last word holder for a line it is necessary to prevent the finger 180 from throwing down a wedge when the pusher 311 inserts the type for the last word of a line into a word holder. This is accomplished by providing upon the finger 180 a shoulder 182 adapted to be engaged by a stud or pin 183 (Figs. 1, 2, 4 and 12) upon a rock shaft 184, mounted in an arm 185 projecting from the bracket 83, and a lever 186 which is secured to the rock shaft and extends over into position to be struck by a cam 318 on the lever 303 which operates the pusher to transfer the type from the line holder to the word holders. When the lever 303 moves to insert the type for the last word of a line into a word holder, the cam 318 depresses the free end of the lever 186 against the action of its spring 306$^a$, and the stud or pin 183 then engages and rocks the finger 180 outward so that during the next movement of the arm 179$^b$, which carries the finger, the finger will not engage a wedge. Therefore, while the bell-crank 179 will be rocked the finger will not throw down a wedge, and this wedge will remain in its normal position.

The selected wedges, that is, those which are acted upon by the finger 180, are moved downward by the finger until the tooth 151, at the lower end of each wedge, passes by a spring pawl 190 (Figs. 2, 4, 5, 5$^a$ and 5$^b$.) One spring pawl is provided for each wedge, and, as shown in Fig. 5$^a$, a spring 191 tends to hold the pawl out of line with the tooth 151 on the wedge, which tooth is normally above said pawl, as shown in dotted lines Fig. 5$^a$. Each pawl has secured to it a spring 192 which extends into a slot 193 in the wall of the clutch member 194, and this detent has an upturned end 192$^a$ for engaging the inner side of the wall above the slot to lock the detent in its inner position, shown in Fig. 5$^b$. Normally a dog or pawl 195, pivoted to the ring 153 bears upon the top of the detent 192 and depresses its upturned end so that the latter is below the top of the slot 193 and the spring 191 holds the pawl 190, in its outer position, as shown in Fig. 5$^a$. Each dog 195 is normally held in this position by a spring 195$^a$, secured to the ring 153 (Fig. 5$^c$).

When a wedge is selected by the finger 180, the wedge is carried downward from the dotted position shown in Fig. 5$^a$ to a point where its tooth 151 is immediately below the pawl 190, as shown in full lines in Fig. 5$^b$. After a wedge is selected, and during the next movement of the space-gage carrier, the dog or pawl 195 is moved off of the detent 192 by a stationary arm 172 (Figs. 1 and 5$^c$). Another stationary arm, 171, bears against the outer end of the pawl 190 after the pawl or dog 195 has been moved off of the detent, and the pawl 190 is pressed inward by the arm 171 and the hooked end 192$^a$ of the detent springs upward and locks the pawl 190 in its inward position, shown in full lines in Fig. 5$^b$. All of the pawls 190 will be thus moved inward, in succession, and these pawls will project over the teeth 151 of selected wedges, which have been moved down a short distance by the finger 180, as shown in full lines in Fig. 5$^b$, while the tooth 151 on any wedge which has not been selected, and which is still in its upper position, will be above the adjacent pawl 190, as shown in dotted lines in Fig. 5$^a$. It will, therefore, be seen, that as the clutch member 194 is moved downward, the pawls 190 will draw downward the selected wedges while those not selected will remain in their upper positions. The pawls 190 are all mounted radially in the cylindrical clutch member 194 which is keyed to the shaft 140 and adapted to slide vertically thereon. The clutch member is cup-shaped at its upper end, as shown, so that the wedges may be moved downward into it. When the wedges corresponding in number to the justifying spaces for a line have been selected and moved downward, the teeth 151 on all of these selected wedges will be in position to be engaged by the pawls 190. When the clutch member 194 is moved downward, as hereinafter explained, the selected wedges will move with said member, and the pawls 195 will spring back into line with the detents 192. When the clutch member is released, after having been moved downward, a spring 200 moves it upward on the shaft 140, and at the end of this upward movement the pawls 195 depress the detents 192, thus unlocking the pawls 190 and the latter are moved radially outward by their springs 191. Thus, after a set of wedges have been selected, and then moved downward, by the clutch member 194, the pawls 190 for these selected wedges are released and remain in their outer position until they again pass by the front of the machine and are operated upon by the stationary arms 171 and 172.

The clutch member 194 is moved downward a distance controlled by the length of the line and the number of justifying spaces in the line, when the line lever is depressed, by the following mechanism: The clutch member 194 has an annular shoulder 201 upon which rests a collar 202, pivotally connected to the forked arms 204$^a$ of a justifying lever 204, the latter being mounted, (Figs. 4, 41, 42 and 43), upon a movable fulcrum pin 205. This fulcrum pin extends through a block 206 which slides in a longitudinal slot 207 in the lever 204. The pin 205 is carried by a slide 208 movable in horizontal guideways 209 in a suitable support or standard 210. A link 211 connects the slide 208 with a lever 212, also pivoted on the support 210 and having at its free end a roller 213 which is adapted to bear against a cam surface 214 at the lower end of a vertical rod 215. This rod has at its upper end two racks 216 and 217 the former adapted to be engaged by a moving-pawl 218 and the latter adapted to be engaged by a holding-pawl 219. A bracket 220 projecting from the standard 143 supports the pawls and forms a guiding means for the upper end of the rod 215. The lower end of the rod moves in a guide 221. The moving-pawl 218 is centrally pivoted and its end portion 218$^a$ tapers, as shown. The pointed end 218$^a$ of the pawl is normally in line with the notches 148 in the wedges $v$ when the latter are in their uppermost or normal positions. When any wedge is moved downward by the finger 180, the tooth 150 on the wedge will engage the end 218$^a$ of the pawl and rock said end downward causing a spring pin 218$^b$ at the opposite end of the pawl to move the rod 215 upward one notch, where it is held by the holding pawl 219. When the wedges rotate one step without having a wedge thrown downward by the finger 180 the notch 148 in the front wedge will allow the wedge to pass the pawl without interference. As one wedge is selected or thrown down for each justifying space inserted in the word-holders for a line, the rod 215 will be moved upward by the pawl 218 one notch for each justifying space in the line and this will cause the cam 214 at the bottom of said rod to actuate the lever 212 and thereby cause the movement of the slide 208 and the fulcrum pin 205 rearwardly or to the left in Fig. 4. The form of the cam 214 is such that when the rod 215 is moved upward the first step or notch, the fulcrum pin 205 will be moved a considerable distance to the left in Fig. 4 from its normal position, and for the successive upward steps or movements of the rod the fulcrum pin will be moved successively shorter distances to the left, the arrangement being such that for any given movement of the outer or forward end of the lever 204, the movement of the inner or rearward end will be in inverse proportion to the number of steps which the rod 215 has moved upward, or, in other words, to the number of wedges selected on the measuring device and the number of justifying spaces in the word-holders for a line. The position of the fulcrum 205 will therefore, depend upon the number of the justifying spaces in the line.

For the purpose of restoring the cam rod 215 to normal position, after it has performed its function, a rod 235 is arranged above the rear end 219$^a$ of the holding pawl 219 and this rod carries a loosely suspended pawl 236 (Figs. 4$^a$ and 4$^b$) which may ride over the end 219$^a$ of the pawl 219 when the rod 235 is moved in one direction, but which will engage said pawl 219 when the rod is moved in the opposite direction and thereby trip the holding pawl 219 and allow the vertical rod 215 to drop or be pulled down by a spring 222 to its normal position. It is necessary to release the spring pressed pin or detent 218$^b$ in order to allow the rod to drop, and, therefore, an arm or lever 219$^b$, secured to the stud on which the pawl 219 is mounted, is provided with a cam-slot 219$^c$, and the walls of this slot engage a pin which projects from the detent 218$^b$, and rock said detent out of engagement with the rack 216 when the holding pawl is tripped to release the rod 215. A pin 237 limits the movement of the pawl 236 in one direction while said pawl is free to move in the opposite direction. When the rock shaft 13 moves to start the cam sleeve 5 the rod 235, above the holding pawl 219 is moved by an arm 238 on the rock shaft in the direction to carry the pawl 236 past the pawl 219 and trips said pawl, allowing the rod 215 to drop downward until the stop 240 on the upper end of said rod, engages the sleeve in which the rod slides and limits its downward movement. When the shaft 13 rocks to stop the rotation of the sleeve 5, the arm 238 moves the rod 235 backward and the pawl on said rod rides over the pawl 219, without disturbing the latter. When the cam 214 drops, to normal position, a spring 241 rocks the lever 212, and causes the fulcrum pin 205 to move forward (to the right in Fig. 4) to normal position.

While the cam sleeve 5 is in operation and one line of type is being inserted in the word-holders and a set of gages corresponding to the justifying spaces in the line are being selected on the space gage carrier, the position of the fulcrum of the justifying lever 204 will be set according to the number of justifying spaces in the line, as already described. At the next operation of the line lever L, and before the cam sleeve starts into operation, the justifying lever is rocked about its fulcrum point, to cause the selected wedges on the space-gage carrier B to be moved downward by the clutch member 194, and the gage pins operated by said wedges to be set radially outward, by a lever 225, extending beneath the forward end of the lever 204 and beneath the line-gage carrier F, and pivoted in an arm 226 projecting from the standard 306. A spring 225$^a$ (Fig. 2) supports the longer arm of the lever, and keeps the shorter arm out of engagement with the cylindrical surface of the carrier F. This lever 225 is rocked by a gage on the carrier F, set by the measurement of the line when the line was first assembled in the line holder and before it was transferred to the rear part of the line holder to be inserted in the word holders.

The line-gage carrier, as shown in detail in Figs. 31, 34, 35 and 36, comprises a sleeve 320, secured to a shaft 321 which is mounted in the two arms 306ᵃ of the standard 306 which supports the line holder. This sleeve has four horizontal slots 322 arranged ninety degrees apart. Within these slots are arranged four wedges 323, 324, 325 and 326, adapted to slide in the slots and held in place by rings 327 and 327ᵃ. These wedges operate gage pins $w$, $w'$, $w^2$ and $w^3$, respectively, which are constructed and arranged in a manner similar to the gage pins on the carrier B. Each wedge also has an integral arm 328 projecting at right angles to the shaft. A ratchet wheel 329 is secured to the shaft 321 and has four teeth, 322ᵃ, adapted to be engaged by a pawl 330 on a collar 331 which turns on the shaft. The collar is oscillated to turn the ratchet wheel and carrier by means of a link 332, connected to a lever 333 which is pivoted on the stationary rod or shaft 20 and has a roller which bears against a cam 334 on the shaft 23. Each time the shaft 23 is set in motion, and makes one revolution, the cam 334, through the connections described, causes the line-gage carrier to turn one-fourth of a revolution, and when the carrier stops one of the wedges will be immediately below the line holder, as shown in Figs. 31 and 36. In turning, in the direction of the arrow, Fig. 36, the diametrically opposite gage will bear upon the roller 335 on the lever 225 which carries the justifying lever 204, and rocks the latter. As this rocking movement of the justifying lever 204 has a tendency to move the fulcrum of the lever rearward, or toward the gage carrier, means are provided for preventing such movement at the time the lever is rocked. For this purpose four cams 360, 361, 362 and 363 (Figs. 31 and 36) are arranged upon the ring 307 of the line-gage carrier, so that one of these will engage and depress one end of a lever 364 just before the lever 225 is depressed by a gage-pin, and the lever 364 will remain depressed until the gage pin has passed beyond the roller on the lever 225. The lever 364 is supported on an arm 365 projecting from the support 210 (Figs. 41 and 43) and is connected pivotally to a plate 366 extending parallel with the justifying lever 204 and pivotally supported upon arms 367 projecting from the support 210. This plate projects over a pin 368 extending from the side of a dog 369 which is secured to and turns on the fulcrum pin 205 of the lever 204. A spring 370 connected between the lever 364 and the arm 365 holds said lever so that the roller at its free end will bear against the cam ring 327 and the plate 366 will normally be above and out of engagement with the pin 368 on the dog 369. Notches 371 are cut in the top of the guide bar 210ᵃ at distances apart equal to the distances which the fulcrum of the justifying lever moves for successive upward steps of the cam rod 215. The dog 369 is normally held with its pointed end in an upper position, as shown in Fig. 42, by a spring 372. When the plate 366 is tipped by a rocking movement of the lever 364, the plate engages the pin 368 and depresses the forward pointed end of the dog into the notch 371 which is at that time opposite the dog. This rocking movement of the lever 364 takes place just before the lever 225 is operated and the plate 336 holds the dog in engagement with the notch while the levers 225 and 204 are being rocked, thus preventing the fulcrum pin from moving inward during the operation of the justifying lever, and holding the fulcrum pin at the exact point to which it is set by the vertical cam rod 215. After the justifying lever has been rocked, the cam on the line-gage carrier passes out of engagement with the lever 364, and the spring 370 rocks said lever so as to move said plate away from the pin on the dog, and the spring on the latter then lifts the dog out of engagement with the notch or shoulder in the guide bar 210ᵃ.

A guide frame 336 is arranged parallel with the line holder upon a bracket or support 337, shown in side view in Fig. 40. This bracket, as shown in Figs. 2 and 40, is pivoted below the channel of the line holder on a stud passing through a suitable bearing 338 in the lower part of the bracket 306. The guide frame 336 is movable toward and from the line holder by a link 339 connected to a lever 340 having a roller adapted to bear upon the periphery of a cam 341 (Figs. 37 and 37ᵃ) having a cam surface 342 for operating said link and lever. Normally the laterally movable guide frame 336 is held adjacent to the line holder, as shown in Figs. 1 and 27, by a spring which connects the lever 340 with the rod 32ᵃ (Fig. 2). It will be understood that each of the levers bearing against the peripheries of the cam wheels on the shaft 23 are held against said wheels by springs connected to the rod 32ᵃ, supported in the bearings 24. The laterally movable guide frame 336 has two guideways 343 and 344 (Fig. 36), parallel with the line holder, and in these guideways are the slides 345 and 346, shown in perspective in Figs. 30 and 28. The guideways are open at the side facing the line holder. The slide 345 has, secured to the side next to the line holder, a pair of arms 347 which normally project across the top and bottom of the channel in the line holder, as shown in Figs. 27 and 36, so as to form a stop for the type. As shown in dotted lines in Fig. 32, a notch 348 and a slot 349 are cut in the side of the line holder to permit the arms 347 to extend into the channel and to move lengthwise of the channel. The slide 345 is normally pressed toward the forward end of the line holder by a spring 350 and an adjustable stop 351 for the slide is arranged in the forward end of the guide frame 336 this stop being adjusted so as to normally hold the stops 347 at a distance from the forward end of the line holder exactly equal to the length of a line of type. Spring retainers 352, having beveled heads, are attached to the forward end of the line holder, these devices being arranged so that type and spaces may pass freely through them into the line holder, but will be prevented from being forced out. After the type and abnormal justifying spaces equal to a line length have been fed into the line holder, the feeding in of the remaining type necessary to form a justified line will cause the type to move the stops 347 rearwardly a distance equal to the overset of the line. A pointer 353 connected to the slide 345 projects upwardly adjacent to a scale 354 (Figs. 3 and 36) which is secured to the frame 336, and the pointer thus indicates upon the scale the length of the line or the oversetting of the line. If desired, an audible signal may be operated by the slide 345 to indicate when sufficient type for a line have been assembled in the line holder. The slide 345 also has a depending arm or lug 355 which extends in front of the arms 328 on the linegages, as shown in Figs. 31 and 36, and when the slide is moved rearward by an overset line the line-gage immediately beneath the line holder will be moved rearwardly by the engagement of the lug 355 with the arm 328 on the wedge. This will cause the gage pin, operated by said wedge, to be adjusted radially outward a distance proportioned to the oversetting of the line. Later on, after the line has been transferred to the word holders, this gage pin moves the lever 225 which operates the justifying lever 204.

The slide 346, shown in perspective in Fig. 28, has, connected to it, a line transferring arm 356, said arm comprising a part 356$^a$ which extends over the line holder, a part 356$^b$ which extends forwardly from the part 356$^a$ to a point slightly beyond the detents 352 at the forward end of the line holder, and a part 356$^c$ which extends downwardly from the part 356$^b$, the latter part being of proper width to enter the type channel and of proper length to engage the type or justifying spaces at their upper and lower ends. The forward end of the part 356$^c$ is beveled as shown at 356$^d$ in order that the part 356$^c$, in passing out of the line holder may spread the retainers 352 apart and not be impeded in its movement.

After a line of type has been assembled in the forward end of the line holder and its measurement has been registered on a line gage by the rearward movement of the stops 347, the guide frame 336 is moved laterally to carry the stops out of line with the channel and to bring the forward end of the transfer arm 356 into line with the channel. The transfer arm is then moved rearwardly to carry the assembled line of type past the pusher 311, which is pressed out of the channel by the type, and after the line has been transferred back of the pusher the transfer arm moves forward out of the channel, and the guide frame 336 then moves back to normal position, carrying the transfer arm out of line with the channel and carrying the line stops 347 into the channel, so that another line may be assembled between said stops and the forward end of the channel. This lateral movement of the guide frame is accomplished through the medium of the link 339, lever 340 and the cam surface 342 on the cam wheel 341, as before explained. The longitudinal movement of the line transferring arm is accomplished by means of a cam surface 357 (Figs. 1 and 37$^a$) upon the cam wheel 341 which engages a roller upon a curved arm 358 attached to a lever 359 having an eye 359$^a$ (Fig. 3) into which a stud 372 on the slide 346 extends. As indicated in dotted lines in Figs. 27 and 36, the stud is movable laterally through the eye in the lever 359, so that the guide frame 336 may move laterally with respect to said lever. After the guide frame has been moved laterally away from the line holder, the lever 359, rocked by the cam surface 357, moves the slide 346 and the transfer arm rearwardly to transfer the assembled line of type back of the pusher and the cam and lever then rock the transfer arm forward, after which the guide frame moves laterally to carry the pusher out of line with the channel in the line holder. Springs 380 (Fig. 32) are secured to one side of the line holder, near its rear end, and extend into longitudinal slots 381 in the line holder so as to apply side pressure or friction to the type and prevent them from moving freely to the rear end of the holder.

The order in which the various parts of the mechanism operate is as follows: The type, with justifying spaces of maximum size, are delivered into the forward end of the line holder E from type magazines or a type casting mechanism, controlled by a key-board. When sufficient type to form a line have been delivered into the line holder the line will be overset, by reason of the abnormal size of the justifying spaces, and the stop 347 is moved by the type a distance equal to the oversetting of the line. The oversetting of the line is indicated by the pointer, connected with the stop, or by an audible signal. The rearward movement of the stop causes the lug 355, connected with the slide which carries the stop, to move one of the wedges on the line holder rearwardly, and the latter adjusts one of the line gage-pins radially outward a distance proportioned to the measurement of the line. This wedge and gage pin, which, together, may be called a line-gage, do not perform any function until after the line of type, by which they are adjusted, has been transferred to the word holders and until after a succeeding line has been assembled and measured in the forward end of the line holder and the mechanism is started to transfer this succeeding line to the word holders, at which time the line-gage set for the first line is carried past the roller on the lever 225 and causes the operation of the justifying lever 204 which sets the gages on the space-gage carrier B so that they, in turn, will adjust the trimming device to trim the spaces of the first line.

After a line has been assembled in the line holder and its measurement registered by a line gage on the line gage carrier, the line lever L is operated to start the shaft 23 in motion by releasing the clutch pin and connecting the collar 25 with the constantly driven pulley 27, and this shaft makes one revolution and then stops. When the shaft 23 is set in motion the cam 342 on the cam wheel 341, first operates to move the guide-frame 336 laterally and thus move the stop 347 out of the channel in the line holder and the transfer arm 356 into line with the channel in the line holder. While the transfer arm is held in line with the channel by the operation of the cam surface 342, the cam surface 357 on the same wheel 341 causes the lever 359 to move the line transfer arm rearwardly to carry the line of type back of the pusher, and then forwardly out of the channel. The cam surface 342 then permits the guide frame 336 to move toward the line holder and carry the transfer arm out of line with the channel and the stop 347 into the channel. The operator may now commence to assemble another line in the forward end of the line holder. After this operation of moving the transfer arm and the stop has taken place, the cam 334 causes the line-gage carrier to turn one-fourth of a revolution, thus carrying the line-gage, set for that line, around ninety degrees, in the direction of the arrow, Fig. 36, and at the same time carrying a gage set for a preceding line, past the roller on the lever 225 and bringing another gage into position beneath the line holder to be set by a succeeding line. After these operations have taken place, and just before the shaft 23 comes to a stop, the cam 22 operates the lever 19 and the link 18 to rock the shaft 13 so as to release the clutch finger 9 and thereby connect the cam sleeve 5 with the constantly driven shaft 2. The detent 35 locks the shaft 13 so as to keep the clutch finger 9 out of engagement with the clutch pin 8 and thereby permit the cam sleeve 5 to remain clutched to the driving shaft.

When the shaft 13 rocks to connect the cam sleeve 5 with the driving shaft 2 the lever 238, on the shaft 13, moves the rod 235 to trip the pawls engaging the upper end of the vertical cam rod 215, thereby allowing said cam rod to drop to its lower position and the spring 241 on the lever 212 (Fig. 4) sets the fulcrum of the justifying lever in its extreme forward, or normal position.

At the time the cam sleeve 5 is set in motion one line of type is in the line holder between the pusher 311 and the word carrier, and a second line is being assembled in the forward end of the line holder by the operator. The cam $g$, on the sleeve 5, the form of which is shown in Fig. 22, first comes into action and causes the lever 303 to operate the pusher 311 which moves the line of type and transfers the first word and a justifying space into a word holder.

Whenever the word carrier is stationary, one word holder is opposite the line holder, another word holder is opposite the cutters and still another holder, which has passed by the cutters, is in position to have its type transferred by the ejector 90 to the galley. Immediately after the cam $g$ has started into action to cause the type and justifying space for the first word in the line to be transferred to a word holder, and before the pusher returns, the cam $e$ acts to cause the finger 180 to move one of the wedges on the space-gage carrier downward a short distance. This downward movement of the wedge rocks the pawl 218 and the latter moves the vertical cam-rod 215 the distance of one tooth upward. This causes the cam 214 on the lower end of said rod to rock the lever 212 and move the fulcrum pin on the justifying lever 204 inward, or toward the space-gage carrier. After the cam wheel $g$ returns the pusher arm to normal position the cam wheel $h$ operates to move the word carrier one step and bring an empty word holder opposite the line holder. The cam $d$ then causes the space-gage carrier B to move one step, bringing a new wedge into position to be acted upon by the finger 180 on the lever 179, and causing one of the gage pins $b$, adjusted for a previous line, to move past the roller on the cutter frame and thus advance the cutters to trim the space in the holder opposite the cutters, which contains the type for a word of said previous line. The cam $f$ operates, approximately at the same time with the cam $d$, and moves the lever 93 and ejector 90 to cause the transfer of the type from the holder opposite the ejector into the galley.

At the commencement of each revolution of the cam sleeve 5 the type for a word, and a justifying space are inserted in a word holder and the operations above described are repeated, until the last word for the line is transferred by the pusher 311 into its word holder. The pusher and the lever 303 which operates it, approach nearer to the word carrier as the type for the successive words are transferred to the word holder, and as there is no justifying space for the type for the last word the pusher advances as far as the depression $g'$ in the cam $g$ will permit, and presses the type into the word holder beyond the stops, the cam 316 on the lever 303 at the end of the movement releasing an index pin $m$ immediately at the left of the word holder for the last word and the cam 318 on said lever depressing the lever 186 so as to rock the pin 183 and cause the latter to swing the finger 180 away from the wedges on the space-gage carrier. At this time, before the pusher and lever 303 start to return, the cam $e$ reciprocates the lever 179, carrying said finger, but as said finger is then out of line with the teeth 147 on the wedges, no wedge will be selected or moved downward when the type for the last word of a line enters a word holder. This wedge will remain in its upper position. One wedge will thus be selected and moved downward a short distance for each word in the line except the last; or, in other words, for each justifying space in the line, and the cam rod 215 is moved upward one notch for each justifying space in the line, each upward step of the rod causing a rearward movement of the fulcrum of the justifying lever 204. After the type for the last word have been inserted by the operation of the cam $g$ and the index pin has been released, and the finger 180 thrown out of action and after the operation of the cam $e$ to reciprocate the finger, the cam $h$ moves the word carrier a final step, and the index pin at the front of the carrier, which was released by the lever 303, engages and moves the lever 38, which, through the link 37, moves the detent lever 35, releasing the rock shaft 13, which is turned by its spring so as to permit the clutch finger 9 to spring back into position to throw out the clutch pin 8, at the completion of the revolution of the cam sleeve 5, to stop the sleeve. Before the sleeve stops, the cam $d$ operates to turn the space gage carrier one step thereby advancing the cutters to trim a space in the word carrier and bring another wedge in line with the end of the finger 180, and the cam $f$ operates to eject the type from one of the word holders into the galley. The sleeve 5 then stops. This first line of type has now been inserted in the holders, and wedges, in the carrier B, corresponding in number to the number of justifying spaces in this first line, have been selected, and the gage pin $w'$ (Fig. 36) in the line-gage carrier F, which was set by the measurement of this line is now ninety degrees removed from the position, immediately beneath the line holder, which it occupied when the measurement was taken. The next line having been assembled and its measurement registered by a gage pin $w$ in the line-gage carrier, the line lever L is again operated to release the shaft 23. This results in transferring the second line back of the pusher, by the operation of the cam wheel 341, and in turning the line gage carrier ninety degrees by the operation of the cam wheel 334, bringing the wedge 326 and gage pin $w^3$ in position for registering the measurement of a third line, and causing the wedge 324 and gage pin $w'$ to pass by the roller on the lever 225 and oscillate said lever. A little in advance of the engagement of the gage pin with the roller on the lever 225, one of the cams 363 on the line gage carrier bears upon the lever 374 and thereby rocks the plate 363 so as to move the dog 369 into one of the notches 371 in the guide bar $210^a$ adjacent to the justifying lever 204, and the dog is held in this position until the gage pin has passed by the roller on the lever 225 and the latter has been rocked. The oscillating movement of the lever 225 is communicated to the justifying lever 204, and the latter is rocked about its fulcrum point, while the dog engages one of the notches to hold the fulcrum in an exact position, causing the clutch member 194 on the end of the latter lever to engage the set of wedges on the space-gage carrier B which were selected and moved slightly downward for the first line, and move these wedges down a distance proportioned to the line measurement and the number of justifying spaces in this first line. The space gage pins operated by these wedges are set out radially to proportionate distances. After the second line has been transferred back of the pusher and the clutch member 194 has moved the set of selected wedges for the first line down the proper distance, and the gage pin $w'$ on the line gage carrier has passed beyond the roller on the lever 225 and the spring 200 has returned to clutch member to its upper position, leaving the selected wedges in the carrier B in their lower positions, the cam wheel 22 on the shaft 23 finally operates to move the rock shaft 13 and start the cam sleeve 5 in operation, the shaft 23 then stopping after having completed one revolution, as before.

When the rock shaft 13 is turned to connect the sleeve 5 with the driving shaft 2, the rod 235 is moved by said shaft to trip the holding pawl 219 and release the rod 215, which was moved up in the course of selecting wedges on the carrier B for the justifying spaces for the first line. Then when the sleeve 5 starts into operation the cams on said sleeve act as before, the type for the words of the second line are transferred to successive holders and a set of wedges on the carrier B are selected for the justifying spaces in this second line, and the cam rod 215 is moved up one step for each wedge selected, causing an adjustment of the fulcrum of the justifying lever for the second line. As the type for the words of one line are being delivered from the line holder into successive word holders, the word holders containing the type and justifying spaces for one or more preceding lines are being carried to the cutters, and while each holder containing a justifying space is opposite the cutters, a gage pin on the carrier B, selected for that particular space, and adjusted according to the oversetting of the line in which that space belongs divided by the number of word spaces in that line, moves past the roller on the cutter frame and moves the cutters against the justifying space, so that the spaces are trimmed to the required size to justify the line.

The cam $i$ rotates with the other cams on the sleeve 5, but performs no function until the index pin following the last word holder for a line, and which was released by the lever 303 and projects outward beyond the other index pins, engages and passes over the cam surface 115$^a$ on the end of the tripping lever 115. When this occurs the latch lever 118 is moved away from the stop 119 and the roller on the lever 120 moves on to the part $i^2$ of the cam $i$, carrying the stop 119 up in front of the latch lever so as to prevent the latch lever from returning to normal position. The roller travels on the low part $i^2$ of the cam until the sleeve has nearly completed its revolution, when the roller moves in to and out of the depression $i^3$ in the cam, thus causing the rod 124 to move up and down, rocking the lever 125 and through the connections previously described advancing the line in the galley and returning the slide 134 to form a new type channel in the galley.

The index pin following the last word for a line, after passing beyond the tripping lever 115, is pressed back to its normal position by the cam 317 (Figs. 1, 12 and 16), before the pin again comes to the front of the machine. Likewise, the wedges on the line gage carrier F are restored to their normal positions by a cam 373 fixed to the standard 306, after operating the lever 225, and while moving around again to the line holder. This cam 373, is shown in dotted lines in Fig. 3, and in full lines in Figs. 36 and 40. As the wedges on the line gage pass this fixed cam the tongues 328 on the wedges are pressed forwardly to their normal positions by the cam surface.

Fig. 16 illustrates the operation of the word carrier, space-gage carrier and cutters. In this figure it is assumed that the type for the last word of a line have been inserted in the word holder $a'$ and the gage pin $m'$ has been released and the cam $h$ on the cam sleeve 5 is about to move the word carrier one step in the direction of the arrow. The holders $a'$ to $a^7$, inclusive, contain the type for the last line inserted in the holders of the word carrier; the holders $a^8$ to $a^{13}$, inclusive, contain the type for a preceding line, and the holders $a^{14}$ to $a^{16}$, inclusive, have had their type delivered to the galley and are returning to the front of the machine. The index pin $m'$ is in position to trip the lever 38 and stop the mechanism after the next movement of the carrier. The holders $a^2$ to $a^7$, inclusive, and the holders $a^9$ to $a^{13}$, inclusive, contain justifying spaces $s$ the ends of which project beyond the periphery of the carrier, while the holders $a'$ and $a^8$, for the last words of the lines, do not contain spaces. The space in the holder $a^{13}$ was trimmed by the cutters during the previous operation of the cam sleeve 5, when the gage pin $b^{13}$ passed by the roller on the cutter slide and advanced the cutters. The gage pins $b^9$ to $b^{13}$, inclusive, are shown in the positions to which they were adjusted to trim the spaces in the word holders $a^9$ to $a^{13}$, inclusive. The wedge controlling the gage pin $b^8$ for the last word of the line, contained in the holder $a^8$, is in its normal position, this wedge not having been selected or moved down by the finger 180 for the reason that there is no space in the holder $a^8$. The wedges controlling the gage pins $b^2$ to $b^7$, inclusive, have been selected by the finger 180, but have not yet been moved to adjust the gage pins by the operation of the justifying lever and clutch member 194. These gage pins will be set out, as shown in dotted lines, the next time the line lever is operated and the line gage, set according to the measurement of the line in the holders $a'$ to $a^7$, inclusive, rocks the lever 225 and the justifying lever and the clutch which moves down the selected wedges for that line. The gage pin $b'$ will not be adjusted but will remain in the position shown, the selecting finger 180 having been thrown out of action when the type for the last word of the line was inserted in the holder $a'$.

The type for the last word of the line contained in the holders $a'$ to $a^7$, inclusive, having been inserted in the word holder $a'$, and the index pin $m'$ having been released as shown in Fig. 16, the word carrier moves in the direction of the arrow and trips the lever 35 from the rock shaft 13 so that the sleeve 5 will come to a stop after completing a revolution. The movement of the word carrier brings the holder $a^{16}$ into position to receive the type from the line holder and it brings the word holder $a^{12}$ opposite the cutters and carries the holder $a^{13}$, with its trimmed space, into line with the channel in the galley. After this movement of the word carrier the space gage carrier moves one step and the gage pin $b^{12}$, in passing the roller on the cutter slide, moves the cutter forward to trim the space in the word holder $a^{12}$ and then allows the cutters to move backward. While the space in the holder $a^{12}$ is being trimmed, or immediately thereafter, the ejector 90 transfers the type and trimmed space from the holder $a^{13}$ to the galley. The cam sleeve 5 is disconnected and stops after the space in the holder $a^{12}$ has been trimmed and the type and space from the holder $a^{13}$ have been delivered into the galley. After a new line has been assembled and measured in the line holder, the operation of the line lever, causes the shaft 23 to make one revolution and this causes the rotation of the line-gage carrier and the adjustment of the gage pins $b^2$ to $b^7$ on the carrier B, through the operation of the justifying lever by the line gage adjusted for the measurement of the line in the holders $a'$ to $a^7$. The assembled line in the line holder is then transferred back of the pusher, and finally, before the shaft 23 stops the rock shaft 13 is moved to release the cam sleeve 5 and this line is transferred to the holders $a^{16}$, $a^{15}$, $a^{14}$, etc., as they come into line with the line holder, after each movement of the word carrier, a space being trimmed and the type from a holder being transferred to the galley. The index pin $m^{14}$, is shown, in Fig. 16, just beyond the tripping lever 115, which it operated, to advance the line which was in the holders $a^{14}$, $a^{15}$, $a^{16}$, etc., in the galley. As the index pin $m^{14}$ approaches the front of the machine it will be pressed back into normal position by the cam 317. When the index pin $m^8$ passes over the end of the lever 115, it will trip said lever and set in motion the mechanism for advancing, in the galley, the line contained in the holders $a^7$ to $a^{13}$. Similarly the index pin $m'$ will, at the proper time trip the lever 115 to advance in the galley the line contained in the holders $a'$ to $a^7$, inclusive, after the spaces in that line have been trimmed and transferred to the galley. The wedges and gage pins on the space gage carrier after having operated the trimming devices, are returned to their normal positions before they come to the front of the machine by the stationary cam 178 (Figs. 2 and 5) which engages the underside of the teeth 147 on the wedges and lifts the wedges. In Fig. 16, the gage pin $b^{14}$, corresponding to the word holder $a^{14}$, which contained the last word for a line was not adjusted and remains in its normal position. The gage pin $b^{15}$ is being returned by the cam 178 to normal position and the gage pin $b^{16}$ has been returned to its normal position, so that its wedge may be acted upon by the finger 180 when the wedge reaches the position occupied by the wedge $v'$.

The justifying spaces act as stops, coacting with the stops in the word holders to limit the movement of the feeding mechanism, so that the pusher 311, when operated, cannot push more than the type for one word and a justifying space, or temporary space, into a word holder. The provision of stops at the entrance to the channels in the word holders, and permanent or temporary spaces which will not pass the stops, are shown in my prior patent and are extremely useful in connection with the feeding mechanism of the present application, since these stops and spaces coact with the reciprocating pusher to divide an assembled line into words and distribute the words into successive word holders, as the word carrier rotates. The term justifying spaces in the claims is used to means the spaces between the words, whether these spaces are temporary or permanent.

What I claim is:—

1. The combination with a series of word holders, and means for moving the same step by step, of means for automatically feeding the type for the successive words of an assembled line, one word at a time, into successive holders.

2. The combination with a series of word holders, and means for moving the same step by step, of means for automatically feeding the type for the successive words of an assembled line, one word at a time, into successive holders, and means for automatically stopping the movement of the word holders and feeding mechanism after the type for the last word of a line have been transferred to a word holder.

3. The combination with a line holder and a series of word holders, of means for automatically transferring the type for successive words of an assembled line, one word at a time, from the line holder into successive word holders.

4. The combination with a line holder and a series of word holders, of means for intermittently moving the word holders relatively to the line holder, and means for transferring the type for successive words of a line, one word at a time, from the line holder to successive word holders.

5. The combination with a line holder and a series of word holders, of mechanism controlled by a line key for automatically transferring the type for successive words of a line, one word at a time, from the line holder to successive word holders.

6. The combination with a line holder and a series of word holders, of mechanism controlled by a line key for automatically moving the word holders step by step to the line holder and for transferring the type for successive words of a line, one word at a time, from the line holder to successive word holders.

7. The combination with a line holder and a series of word holders, of mechanism controlled by a line key for automatically transferring the type for successive words of a line, one word at a time, from the line holder to successive word holders, and means for automatically stopping said mechanism after the line of type has been transferred.

8. The combination with a line holder and a series of word holders, of mechanism controlled by a line key for automatically moving the word holders step by step to the line holder and for transferring the type for successive words of a line, one word at a time, from the line holder to successive word holders, and means for automatically stopping said mechanism after the line of type has been transferred.

9. The combination with a line holder and a series of word holders, each word holder having a channel to receive type and a stop to prevent a space from passing through the channel, of means for automatically feeding the type and spaces of an assembled line, one word at a time, from the line holder to successive word holders.

10. The combination with a line holder adapted to hold an assembled line of type and a series of word holders each word holder having a channel to receive type and a stop to prevent a space from passing through the channel, of means for intermittently moving the word holders relatively to the line holder, and means for intermittently moving the assembled line of type in the line holder toward the successive word holders.

11. The combination with a line holder and a series of word holders, of means for intermittently moving the word holders relatively to the line holder, and means for yieldingly and intermittently pressing a column of type in the line holder toward the successive word holders.

12. The combination with a line holder adapted to hold an assembled line of type, and a rotary word carrier having word holders each adapted to hold the type for one word of the line, of means for automatically rotating the word carrier step by step and means for transferring the type for one word of a line from the line holder into each of the word holders during the stationary intervals of the word carrier.

13. The combination with a line holder, adapted to receive an overset line of type, of a series of word holders, means for automatically transferring the type and spaces for the several words of a line, one word at a time, from the line holder into separate word holders, and means for reducing the spaces, while in the holders, to justify the line.

14. The combination with a line holder, adapted to receive an overset line of type, of a series of word holders, means for transferring the type and spaces for the several words of a line, one word at a time, from the line holder into separate word holders, means for reducing the spaces, while in the holders, to justify the line and means for transferring the type and reduced spaces from the word holders and assembling them in a line in a galley.

15. The combination with a line holder and a line-gage for measuring a line of type when assembled in the line holder, of a series of word holders, each adapted to receive the type for one word of a line and a justifying space, and mechanism, controlled by a line key or lever, for automatically transferring the type for the words, one word at a time, with spaces, from the line holder to successive word holders.

16. The combination with a line holder adapted to receive a line of type, of a stop adjustable by the type when the line is overset, a series of line gages, and means for moving said gages successively into position to be adjusted by said stop.

17. The combination with a line-holder, of a series of line-gages, and means for adjusting successive line-gages according to the measurement of successive lines inserted in the line holder.

18. The combination with a line-holder, of a series of line-gages, means for adjusting successive line-gages according to the measurement of successive lines inserted in the line holder, a justifying device, and means for actuating said device by said line gages.

19. The combination with a line holder, of a series of line-gages, means for adjusting successive line-gages according to the measurement of successive lines inserted in the line holder, a justifying lever, and means for actuating said lever by said line-gages.

20. The combination with a line holder, of a series of line-gages, means for adjusting successive line-gages according to the measurements of successive lines inserted in the line holder, a justifying lever, and means for actuating said lever by a gage adjusted for one line after a succeeding gage has been adjusted for a succeeding line.

21. The combination with a line holder, of a rotary line-gage carrier, a series of line-gages on said carrier, means for rotating said carrier step by step, means for adjusting said gages, in succession, according to the measurement of successive lines inserted in the line holder, a justifying lever, and means for actuating said lever by the adjusted gages, in succession.

22. The combination with a line holder, of a rotary line-gage carrier, a series of line-gages on said carrier, means for rotating said carrier step by step, means for adjusting said gages, in succession, according to the measurement of successive lines inserted in the line holder, a justifying lever, and means for actuating said lever by a gage adjusted for one line after a succeeding gage has been adjusted for a succeeding line.

23. The combination with a line holder adapted to hold an assembled line of type and means for measuring the line in the line holder, of a series of word holders, means for transferring the type for the several words of the line from the line holder to separate word holders, means for regulating the width of the spaces in the several word holders, and means for ejecting the type and spaces from the word holders into a galley.

24. The combination with a line holder, means for measuring an assembled line of type in the line holder, a series of word holders, a corresponding series of space-gages, a device controlled by the space-gages for regulating the width of the justifying spaces for the line, means for automatically transferring the line of type from the line holder to the word holders and means for adjusting the space-gages according to the number of justifying spaces in the line and the measurement of the line.

25. The combination with a line holder, means for measuring an assembled line of type in the line holder, a series of word holders, a corresponding series of space-gages, a device controlled by the space-gages for regulating the width of the justifying spaces for the line, means, controlled by a line key, for automatically transferring the line of type from the line holder to the word holders and means for adjusting the space-gages according to the number of justifying spaces in the line and the measurement of the line.

26. The combination with a line holder and a plurality of line gages for registering the lengths of lines of type successively assembled in the line holder, of a series of word holders, means for transferring the type for the words of each line from the line holder to successive word holders, a space regulating device for regulating the width of the justifying spaces in each line, space gages for adjusting said device, and means whereby the space gages for one line are adjusted by a line gage, set for that line, after the line has been transferred to the word holders.

27. The combination with a line holder and a plurality of line gages for registering the lengths of lines of type successively assembled in the line holder, of a series of word holders, means for transferring the type for the words of each line from the line holder to successive word holders, a space regulating device for regulating the width of the justifying spaces in each line, space gages for adjusting said device, and means whereby the space gages for one line are adjusted by a line gage, set for that line, after the line has been transferred to the word holders, and after another line gage has been adjusted by a succeeding line assembled in the line holder.

28. The combination with a line holder and an adjustable stop therein, of a series of line gages, means, controlled by a line key, for bringing said gages successively into position to be adjusted by said stop, a series of word holders, means for transferring a line of type from the line holder to successive word holders each time the line key is operated, a space regulating device, space gages for adjusting said device, and connections arranged between the line and space gages whereby the line gage, adjusted for one line, adjusts a set of space gages for that line after said line has been transferred to the word holders and after another line gage has been set by a succeeding line in the line holder.

29. The combination with a line holder and an adjustable stop therein, of a series of line gages, means controlled by a line key, for bringing said gages successively into position to be adjusted by said stop, a series of word holders, means for transferring a line of type from the line holder to successive word holders each time the line key is operated, a space regulating device, space gages for adjusting said device, and connections arranged between the line and space gages whereby the line gage, adjusted for one line, adjusts a set of space gages for that line after said line has been transferred to the word holders and after the operation of the line lever to transfer a succeeding line from the line holder to the word holders.

30. The combination with a line holder adapted to receive an assembled line of type, and an adjustable stop in the line holder, of a series of line gages, and means controlled by a line key for moving said gages successively into position to be engaged by said stop.

31. The combination with a line holder adapted to receive an assembled line of type, and an adjustable stop in the line holder, of a movable line gage carrier, a series of line gages on said carrier and means controlled by a line key for moving said carrier to bring the gages in succession into position to be adjusted by said stop.

32. The combination with a line holder adapted to receive an assembled line of type, and an adjustable stop in the line holder, of a rotary line gage carrier, a plurality of line gages on said carrier, and means controlled by a line key for moving said carrier to bring successive line gages into position to be adjusted by said stop.

33. The combination with a line holder and an adjustable stop therein, of a series of line-gages, means, controlled by a line-key, for bringing said line-gages successively into position to be adjusted by said stop, justifying devices, and means whereby each line-gage actuates said devices after a succeeding line-gage has been adjusted by said stop.

34. The combination with a line holder and an adjustable stop therein, of a line-gage carrier having a series of line-gages, means, controlled by a line-key, for moving said gages successively into position to be adjusted by said stop, justifying devices, and means whereby each line-gage actuates said devices after a succeeding gage has been adjusted by the stop.

35. The combination with a line holder and an adjustable stop therein, of a rotary line-gage carrier adjacent to the line holder, a series of line-gages in said carrier, each gage comprising a wedge having a tongue or shoulder adapted to be engaged by said stop, means controlled by a line key for bringing said wedges successively into position to be adjusted by said stop, justifying devices, and means whereby each line-gage actuates said devices after a succeeding line gage has been adjusted by said stop.

36. The combination with a line holder and an adjustable stop therein, of a rotary line-gage carrier having a series of line-gages, means, controlled by a line-key, for rotating said carrier, step by step, to bring successive line-gages into position to be adjusted by said stop, justifying devices movable by the adjusted line-gages, and means for returning said adjusted line-gages to normal positions after operating said justifying devices.

37. The combination with a line holder and a series of word holders, of an adjustable stop normally extending into the line holder, a series of line-gages, and means for moving said gages successively into position to be adjusted by said stop, means for moving said stop out of the line holder, means for transferring an assembled line to the rear of the stop, and means for automatically feeding the assembled line into the word holders.

38. The combination with a line holder, and a series of word holders, of a guide frame movable toward and from the line holder, an adjustable stop carried by said guide-frame and normally projecting into the line holder, a line transferring device carried by said guide-frame and normally out of line with the line holder, a series of line-gages adapted to be moved successively into position to be adjusted by said stop, and mechanism, controlled by a line-key, for moving said guide-frame laterally, for reciprocating said line transferring device and for moving said line-gages.

39. The combination with a line holder, and a series of word holders movable step by step, of a pusher for moving type from the line holder to the word holders, an adjustable stop normally projecting into the line holder in advance of said pusher, a transferring device for transferring a line of type from in front of the stop to the rear of the pusher, a series of line-gages movable into position to be acted upon by said stop, mechanisms controlled by a line-key for moving said stop out of the line holder, for moving said transferring device to transfer the line back of the pusher and for moving said line gages, and means, also controlled by said line-key, and acting after the line has been transferred back of the pusher, for moving said word carrier step by step and reciprocating said pusher.

40. The combination with a line holder, and a series of word holders movable step by step, of a pusher for moving type from the line holder to the word holders, an adjustable stop normally projecting into the line holder in advance of said pusher, a transferring device for transferring a line of type from in front of the stop to the rear of the pusher, a series of line-gages movable into position to be acted upon by said stop, mechanisms controlled by a line-key for moving said stop out of the line holder, for moving said transferring device to transfer the line back of the pusher and for moving said line gages, means, also controlled by said line-key, and acting after the line has been transferred back of the pusher, for moving said word carrier step by step and reciprocating said pusher, and means for automatically stopping the movements of the word carrier and pusher after the last word for a line has been transferred to a word holder.

41. The combination with a line holder adapted to hold a line of type, a series of word holders each adapted to hold the type for one word of a line, mechanism for moving said word holders step by step to the line holder, mechanism for feeding the line of type from the line holder into the word holders, means, controlled by the operation of a line-key, for starting said mechanisms into operation, and means for automatically stopping said mechanisms after the line has been delivered into the word holders.

42. The combination with a line holder adapted to hold a line of type, a series of word holders each adapted to hold the type for one word of a line, mechanism for moving said word holders step by step to the line holder, mechanism for feeding the line of type from the line holder into the word holders, means controlled by the operation of a line-key for starting said mechanisms into operation, and means actuated by said feeding mechanism for stopping said mechanisms after the line has been delivered into the word holders.

43. The combination with a line holder adapted to hold a line of type, a series of word holders each adapted to hold the type for one word of a line, mechanism for moving said word holders step by step to the line holder, mechanism for feeding the line of type from the line holder into the word holders, means controlled by the operation of a line-key for starting said mechanisms into operation, index devices movable with the word holders, means actuated by the feeding mechanism for moving one of said index devices from normal position when the type for the last word of a line is delivered into a word holder, and stopping mechanism arranged to be actuated by said index device.

44. The combination with a rotary word carrier having word holders, a rotary space-gage carrier having space-gages, devices for feeding a line of type to said word holders, a space regulating device adjustable by said space-gages for regulating the width of the justifying spaces in the word holders, and mechanisms for operating said carriers step by step and for operating said feeding devices, of a driving shaft, means for operatively connecting said mechanisms to said driving shaft until a line of type has been fed into the word holders, and means for disconnecting said mechanisms from said shaft after the line has been delivered to the word holders.

45. The combination with a rotary word carrier having word holders, a rotary space-gage carrier having space-gages, devices for feeding a line of type to said word holders, a space regulating device adjustable by said space-gages for regulating the width of the justifying spaces in the word holders, and mechanisms for operating said carriers step by step and for operating said feeding devices, of a driving shaft, means, controlled by a line-key, for operatively connecting said mechanisms to said driving shaft until a line of type has been fed into the word holders, and means for disconnecting said mechanisms from said shaft after the line has been delivered to the word holders.

46. The combination with a line holder, means for measuring an assembled line of type therein, a rotary word carrier having word holders, a space-gage carrier having space-gages, devices for feeding a line of type from the line holder to said word holders, a space regulating device adjustable by said space-gages for regulating the width of the justifying spaces in the word holders, and mechanisms for operating said carriers step by step and for operating said feeding devices, of a driving shaft, means controlled by a line-key for operatively connecting said mechanisms to said driving shaft until a line of type is fed into the word holders, and means for disconnecting said mechanisms from said shaft after a line has been delivered to the word holders, from the line holder.

47. The combination with a line holder, means for measuring an assembled line of type therein, a rotary word carrier having word holders, a space-gage carrier having space-gages, devices for feeding a line of type from the line holder to said word holders, a space regulating device adjustable by said space gages for regulating the width of the justifying spaces in the word holder, and mechanisms for operating said carriers step by step and for operating said feeding devices, of a driving shaft, means controlled by a line-key for operatively connecting said mechanisms to said driving shaft until a line of type is fed into the word holders, and means controlled by the feeding mechanism for disconnecting said mechanisms from said shaft after a line has been delivered to the word holders from the line holder.

48. The combination with a rotary word carrier having a series of word holders and a series of index devices movable therewith, mechanisms for moving said carrier step by step and for automatically feeding the type for the several words of a line into successive word holders, a driving shaft, starting means, controlled by the operation of a line-key, for connecting said mechanisms to said driving shaft, means for locking said starting mechanism in the operative position, and means for setting one of said index devices to trip said locking mechanism when the type for a line have been inserted in the word holders.

49. The combination with a rotary word carrier having a series of word holders and a series of index devices movable therewith, mechanisms for moving said carrier step by step and for automatically feeding the type for the several words of a line into successive word holders, a driving shaft, starting means, controlled by the operation of a line-key, for connecting said mechanisms to said driving shaft, means for locking said starting mechanism in the operative position, and means operated by the feeding mechanism for setting one of said index pins to trip said locking means when the type for a line have been inserted in the word holders.

50. The combination with a word carrier having a series of word holders and a series of index devices, and means for moving said carrier step by step, of a line holder, means for feeding the type for successive words of a line from the line holder into successive word holders, means for starting the carrier and feeding means into operation, stopping devices, and means for setting one of said index devices to actuate the stopping devices after the line of type has been fed into the word holders.

51. The combination with a word carrier having a series of word holders and a series of index devices, and means for moving said carrier step by step, of a line holder, means for feeding the type for successive words of a line from the line holder into successive word holders, means for starting the carrier and feeding means into operation, stopping devices, means for setting one of said index devices to actuate the stopping devices after the line of type has been fed into the word holders, a galley, line advancing mechanism for the galley and means controlled by said latter index pin for operating the line advancing mechanism.

52. The combination with a line holder and a rotary word carrier, said carrier having a series of word holders and a corresponding series of index devices, said devices being normally in inoperative positions, feeding means for feeding a line of type from the line holder into the word holders, means for starting the carrier and feeding means into operation, a stopping device normally out of the path of movement of the index devices, and means for moving one of said index devices into position to engage said stopping device after the line of type has been fed into the word holders.

53. The combination with a word carrier having a series of word holders, a space-gage carrier having a series of space-gages, means for moving said carriers step by step, a line holder, means for feeding the type for the successive words of an assembled line from the line holder into successive word holders, a device adapted to select a space-gage on the space-gage carrier each time the type for a word is delivered into a word holder, and means controlled by the feeding mechanism for rendering said device inoperative when the type for the last word in the line holder is delivered into a word holder.

54. The combination with a line holder, a line-gage for registering the measurement of an assembled line in the line holder, a series of word holders, a series of space-gages, a space regulating device adapted to be adjusted by said space-gages, means, controlled by a line key, for automatically feeding the line into successive word holders, means for selecting a space-gage for each justifying space in the line, a justifying lever for moving the selected space-gages, means for adjusting the fulcrum of said lever according to the number of space-gages selected for a line, and means for operating said justifying lever by said line-gage after the line has been delivered to the word holders.

55. The combination with a line holder, a line-gage for registering the measurement of an assembled line in the line holder, a series of word holders, a series of space-gages, a space regulating device adapted to be adjusted by said space-gages, means, controlled by a line-key, for automatically feeding the line into successive word holders, means for selecting a space-gage for each justifying space in the line, a justifying lever for moving the selected space-gages, means for adjusting the fulcrum of said lever according to the number of space-gages selected for a line, and means for operating said justifying lever by said line-gage after the line-key is operated to transfer a succeeding line to the word holders.

56. The combination with a line holder, a series of line-gages for registering the measurement of lines of type assembled successively in the line holder, a series of word holders, a series of space-gages, a space regulating device adapted to be adjusted by said space-gages, means, controlled by a line key, for moving the line-gages successively into position to measure the lines, means for automatically feeding one line into successive holders each time the line-key is operated, means for selecting a space-gage for each justifying space delivered into the word holders, a justifying lever for moving the selected space-gages, means for adjusting the fulcrum of said lever according to the number of space-gages selected for a line, means for automatically stopping the mechanism after a line has been fed to the word holders and the space-gages have been selected, and means whereby the line-gage adjusted for a line transferred to the word holders operates the justifying lever when the line-key is operated to transfer a succeeding line to the word holders.

57. The combination with a justifying lever and means for adjusting the fulcrum of said lever according to the number of justifying spaces in a line, of a dog connected with said lever, a series of fixed stops or shoulders adapted to be engaged by said dog, a line-gage carrier having gages adapted to rock said lever, and means operated by said carrier for holding said dog in engagement with one of said stops while the lever is being rocked.

58. The combination with a justifying lever and means for adjusting the fulcrum of said lever according to the number of justifying spaces in a line, of a dog connected with said justifying lever, a series of fixed stops or shoulders adapted to be engaged by said dog, a rotary line-gage carrier having a series of line-gages adapted to rock said justifying lever, a plate or bar extending parallel with the justifying lever and adapted to engage and move said dog, cams on said line-gage carrier, and a lever movable by said cams and adapted to operate said plate.

59. The combination with a justifying lever and means for adjusting the fulcrum of said lever according to the number of justifying spaces in a line, of a dog connected with said justifying lever, a series of fixed stops or shoulders adapted to be engaged by said dog, a rotary line-gage carrier having a series of line gages adapted to rock said justifying lever, cams on said carrier, and means, movable by said cams, for holding said dog in engagement with one of said stops while the justifying lever is being rocked.

60. The combination with a line holder, a rotary line-gage carrier, a transferring device for transferring a line of type from front to rear of the line holder, a constantly rotating member, a shaft or sleeve adapted to be clutched to said member for one revolution, and then stopped, to operate said carrier and transferring device once, a second sleeve or shaft adapted to be clutched to a constantly driven member by the operation of said first mentioned shaft or sleeve, a space-gage carrier, a word carrier having word holders, and a feeding mechanism adapted to be operated by said second sleeve or shaft, and means for preventing the stoppage of said second sleeve or shaft until a line has been fed from the line holder into the word holders.

61. The combination with a line holder, a rotary line-gage carrier, a transferring device for transferring a line of type from front to rear of the line holder, a constantly rotating member, a shaft or sleeve adapted to be clutched to said member for one revolution, and then stopped, to operate said carrier and transferring device once, a second sleeve or shaft adapted to be clutched to a constantly driven member by the operation of said first mentioned shaft or sleeve, a space-gage carrier, a word carrier having word holders, and a feeding mechanism adapted to be operated by said second sleeve or shaft, and means for preventing the stoppage of said second sleeve or shaft until a line has been fed from the line holder into the word holders and means, controlled by the feeding mechanism, for stopping said second sleeve or shaft.

62. The combination with a line holder, a word carrier having word holders, and means for moving the word carrier step by step, of a pusher for moving a line of type in the line holder toward the word holders, a lever for reciprocating said pusher, a cam for moving said lever away from the word carrier and a spring for moving said lever toward the word carrier.

63. The combination with a line holder of a movable guide frame having a guide way parallel with the line holder, a slide movable in said guideway and having a line transferring arm normally out of line with the line holder, means for moving the guide frame laterally with respect to the line holder, and means for moving said slide along said guideway without interfering with the lateral movement of the slide and guide frame.

64. The combination with a stationary line holder, of a guide frame parallel with the line holder, a bracket or arm hinged beneath the line holder and supporting said guide frame, an adjustable stop carried by the guide frame and adapted to project into the line holder when the guide frame is in normal position, and means for automatically moving said stop out of and into the line holder when the line key is operated.

65. The combination with a stationary line holder and a rotary line-gage carrier beneath the line holder, of a laterally movable guide frame at one side of the line holder, an adjustable stop mounted on said guide frame and normally projecting into the line holder, said stop having a lug or projection connected thereto, and line-gages on said carrier adapted to be engaged by said stop.

In testimony whereof I affix my signature, in presence of two witnesses.

WILLIAM T. HOOFNAGLE.

Witnesses:
MALCOLM W. CLEPHANE,
L. R. BREDAUER.

---

Copies of this patent may be obtained for five cents each, by addressing the "Commissioner of Patents, Washington, D. C."